United States Patent
Watanabe et al.

(10) Patent No.: US 7,624,326 B2
(45) Date of Patent: Nov. 24, 2009

(54) ENCODING DEVICE AND METHOD, DECODING DEVICE AND METHOD, PROGRAM, AND RECORDING MEDIUM

(75) Inventors: Shuichi Watanabe, Chiba (JP); Yasuaki Tokumo, Funabashi (JP); Hiroyuki Katata, Chiba (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 468 days.

(21) Appl. No.: 10/543,005

(22) PCT Filed: Jan. 22, 2004

(86) PCT No.: PCT/JP2004/000563

§ 371 (c)(1),
(2), (4) Date: Jul. 22, 2005

(87) PCT Pub. No.: WO2004/070955

PCT Pub. Date: Aug. 19, 2004

(65) Prior Publication Data

US 2006/0188167 A1    Aug. 24, 2006

(30) Foreign Application Priority Data

Feb. 3, 2003  (JP)  ............... 2003-025365
Jul. 1, 2003   (JP)  ............... 2003-189517

(51) Int. Cl.
*H03M 13/00* (2006.01)
(52) U.S. Cl. ..................... 714/752; 714/702
(58) Field of Classification Search ............. 714/702, 714/752, 781
See application file for complete search history.

(56) References Cited

U.S. PATENT DOCUMENTS

| | | | | |
|---|---|---|---|---|
| 5,233,349 A | * | 8/1993 | Moulsley | 341/107 |
| 5,327,299 A | * | 7/1994 | Nishikawa et al. | 360/48 |
| 5,737,596 A | * | 4/1998 | Chambers | 707/100 |
| 5,781,237 A | * | 7/1998 | Fukuda | 375/240.04 |
| 5,907,637 A | * | 5/1999 | Murashita et al. | 382/239 |
| 7,233,953 B2 | * | 6/2007 | Heuer et al. | 707/100 |

FOREIGN PATENT DOCUMENTS

| | | |
|---|---|---|
| JP | 2001-326901 A | 11/2001 |
| JP | 2002-123523 A | 4/2002 |
| JP | 2002-132834 A | 5/2002 |
| JP | 2003-92757 A | 3/2003 |

OTHER PUBLICATIONS

Avaro et al., IEEE Transactions on Circuits and Systems for Video Technology, vol. 11, No. 6, Jun. 2001, pp. 760-764.
"Text of ISO/IEC 15938-1/PDAM1", Video Standards and Drafts, No. N5486, Jan. 21, 2003, XP030012706, Section 7.6.5.5 Position Codes.

(Continued)

*Primary Examiner*—Esaw T Abraham
(74) *Attorney, Agent, or Firm*—Birch, Stewart, Kolasch & Birch, LLP

(57) ABSTRACT

An encoding device for differential encoding/decoding a plurality of pieces of position information, represented in a rational number and arranged in the order of magnitude, includes a position information rearranging unit. The position information rearranging unit rearranges the plurality of pieces of position information in accordance with a predetermined order relationship. In the same way as position information in integer representation is encoded, the plurality of pieces of position information rearranged in accordance with the predetermined order relationship can be difference encoded.

22 Claims, 29 Drawing Sheets

OTHER PUBLICATIONS

Claude Seyrat et al., "AHG on MPEG-7 Systems", Video Standards and Drafts, No. M9376, Mar. 9, 2003, XP030038303, Section 6.3.2 Item b—Multiple payload mode with the rational position codes.

Andreas Hutter et al., "Answer to CfP on MPEG-7 Systems Extension: BiM extension supporting the dynamic insertion of new elements", Video Standards and Drafts, No. M8621, Jul. 25, 2002, XP030037577.

"Core Experiments for Systems Extensions" Video Standards and Drafts, No. N5487, Jan. 21, 2003, XP030012707, Chapter 4 CE-9: Evaluation of specification consistency.

Shuichi Watanabe et al., "Report on MPEG-7 Systems ME-1: Evaluation of the rational position codes framework", Video Standards and Drafts, No. M10061, Oct. 14, 2003, XP030038940.

Shuichi Watanabe et al., "Specifications and CE Results on the multiple payload mode with the rational position codes (CE-9: Item b)", Video Standards and Drafts, No. M9483, Mar. 4, 2003, XP030038399.

Shuichi Watanabe et al., "Report on MPEG-7 Systems CE-9 Item f: Multiple payload mode with rational position codes (Mini-Experiment)", Video Standards and Drafts, No. M9818, Jul. 15, 2003, XP030038709.

* cited by examiner $1/2 \rightarrow 1/4 \rightarrow 3/4 \rightarrow 1/8 \rightarrow 3/8 \rightarrow 5/8 \rightarrow 7/8 \rightarrow 1/16 \rightarrow \cdots$

FIG. 6

| CODE (BINARY NOTATION) | MEANING OF CODE |
|---|---|
| 00 | DEFICIENCY CODE |
| 01 | INCREASE IN FIRST LAYER (INITIAL VALUE SET IN LOWER LAYER) |
| 10 | INCREASE IN SECOND LAYER |
| 11 | END CODE |

| DECODING ORDER (COUNTING ORDER) | DECODED VALUE | COUNT | SUMMING ORDER |
|---|---|---|---|
| 1 | 1/2 | $M_1$ | 2 |
| 2 | 1/4 | $M_2$ | 1 |
| 3 | 3/4 | $M_3$ | 3 |

| DECODING ORDER (COUNTING ORDER) | DECODED VALUE | COUNT | SUMMING ORDER |
|---|---|---|---|
| 1 | 1/2 | $M_1$ | 4 |
| 2 | 1/4 | $M_2$ | 2 |
| 3 | 3/4 | $M_3$ | 6 |
| 4 | 1/8 | $M_4$ | 1 |
| 5 | 3/8 | $M_5$ | 3 |
| 6 | 5/8 | $M_6$ | 5 |
| 7 | 7/8 | $M_7$ | 7 |

FIG. 29

| CODE (BINARY NOTATION) | MEANING OF CODE |
|---|---|
| 01 | INCREASE BY ONE IN FIRST LAYER (LOWER LAYER SET TO INITIAL VALUE 0) |
| 10 | INCREASE BY ONE IN SECOND LAYER |
| 11 | END CODE |

Related Art

ENCODING DEVICE AND METHOD, DECODING DEVICE AND METHOD, PROGRAM, AND RECORDING MEDIUM

TECHNICAL FIELD

The present invention relates to an encoding device, an encoding method, a decoding device, a decoding method, a program, and a recording medium and, in particular, to an encoding device, an encoding method, a decoding device, a decoding method, a program, and a recording medium for encoding/decoding a plurality of pieces of position information, at a time, the position information relating to leaves and/or nodes in a tree structure efficiently.

BACKGROUND OF THE INVENTION

Data represented in a tree structure is used in a diversity of information processing fields. One of typical examples is a tree structure representation of search information of moving image contents.

FIG. 26 illustrates an example of search information having a tree structure of the moving image contents.

One single moving image content is composed of one or a plurality of scenes, and one scene is composed of one or a plurality of shots. Each shot is provided with data that represents features of the shot, such as motion intensity, frequency of occurrence of color, and a summary of the content of the shot. A tree structure of FIG. 26 represents the search information of the moving image content.

FIG. 26 illustrates the search information of the moving image content. The moving image content of FIG. 26 is composed of three scenes (#0, #1, and #2). Each scene is composed of three shots (#0, #1, and #2). Each shot is provided with data representing motion intensity. In this example, the motion intensity can take three levels of high=3, intermediate=2, and low=1.

The moving image content is a root of the tree structure. Tag information of the motion intensity representing the scene, the shot, and type of data corresponds to a node, and actual data of the motion intensity corresponds to a leaf. The scene is a first branch position if viewed from the root, namely, a node of a first layer, and the shot is a node of a second layer. FIG. 26 illustrates an example only, and the moving image content and its search information typically have a more complex layered structure.

When the search information of the moving image content is handled, requests to retrieve the search data at each leaf for transmission or storage are issued at any time. In this case, since individual retrieved data itself cannot be identified, identification information is attached to the data. For example, as shown in FIG. 26, data 2601 itself is a mere value "1", and can be used as the search data only when identification information indicating what shot number of what scene number the search data has is attached.

According to MPEG-7, as International Standards of multi-media contents description, relating to the search information such as the moving image content, identification information of search data=leaf is provided by information of a path of the tree extending from the root to the leaf of the tree structure. The path information is referred to as "Tree Branch Code" in MPEG-7. For example, data 2601 of FIG. 26 is uniquely identified by /scene #0/shot #0/motion intensity. Similarly, data 2602 is identified by /scene #0/shot #1/motion intensity, and data 2604 is identified by /scene #1/shot #0/motion intensity. The node is also similarly represented. Identification information of each node is represented by information of a path of the tree from the root to the node of the tree structure.

The information of "scene", "shot", and "motion intensity" of the above-mentioned identification information represents an element type of the search information. Numerical information, such as "0" and "1", is an identification number to identify one element from another when the one element is branched off from one node. Since the numerical information determines the position of each leaf and node in the tree structure, the numerical information is referred to as "position information." In MPEG-7, the element type information and the position information are separately encoded, and handled together with the search data.

The identification information of each of data 2601-2609 is identical in element type information but different in position information. MPEG-7 defines a data format that allows a plurality of pieces of search data tagged with identification information different only in position information to be transferred or stored together. Therefore, MPEG-7 specifies the following position information encoding/decoding technique for differential encoding a plurality of different pieces of position information.

FIG. 27 is a functional block diagram illustrating the schematic structure of a position information encoding device that performs an MPEG-7 differential encoding process in accordance with a known technique. FIG. 28 illustrates an example of position information to be encoded by an encoding device, and a position information code string encoded by the encoding device in accordance with the known technique, more specifically, illustrates the relationship between the information extracted from the identification information of motion intensity data 2601-2609 of FIG. 26 and the position information code string obtained as a result of encoding.

Leaf 2601 and leaf 2602 as two adjacent pieces of search data of FIG. 26 are compared over a tree path extending from a root 2610 to each of leaves 2601 and 2602. The path from the root (moving image content) to a node (scene #0) at a first layer is common to the two leaves 2601 and 2602. The paths branch off from the scene #0, namely, a node (shot #0 and shot #1) at a second layer. The layer immediately below the branching is referred to as a "branch layer" to the two adjacent leaves. The branch layer of the leaf 2601 and the leaf 2602 is the second layer, namely, a shot layer. Similarly, paths of two adjacent leaves 2603 and 2604 commonly share only the root (moving image content), and already branch off at the nodes at the first layer (scene #0 and scene #1). The branch layer of the two adjacent leaves 2603 and 2604 is the first layer, namely, the scene layer.

The branch layer is now viewed in terms of mutual relationship of the position information extracted from the identification information of FIG. 28. If the values of two adjacent pieces of position information at each layer are compared successively from an upper layer to a lower layer, the branch layer is a layer where the values change first. The known differential encoding technique is based on the premise that the value of the position information increases by 1 at each time, and a change in the value of the position information is converted into information that indicates what layer the position information has changed in value at. The information of the branch layer is thus encoded and the original position information is encoded. It is sufficient in such a differential encoding technique if the number of existing branch layers can be discriminated in the encoding. Information in the differential encoding technique is thus compressed compared with the case in which the position information is directly encoded.

An initial position information encoding unit 2702 encodes initial position information using an ordinary method rather than a difference technique. As shown in FIG. 28, initial position information (0,0) is represented by 10 bits=5 bits×2 with 5 bits per variable. At the same time, the initial position information (0,0) is input to and stored in a preceding position information storage unit 2703 to be used for encoding next position information (0,1).

A branch layer determining unit 2704 compares input position information being encoded next with the position information stored in the preceding position information storage unit 2703, determines a branch layer based on the comparison results, and outputs the determination results to a differential position information encoding unit 2705. As shown in FIG. 28, second position information (0,1) being encoded next and the position information (0,0) stored in the preceding position information storage unit 2703 has the identical value of the first layer, namely, the scene layer. The value of the position information of the second layer, namely, the shot layer is increased. This means that the paths branch off at the second layer=shot layer. The determination results are output to the differential position information encoding unit 2705.

The differential position information encoding unit 2705 selects and outputs a position information code according to the determination results of the branch layer determining unit 2704. Since the branch layer determining unit 2704 determines that the branch layer between (0,1) and (0,0) is the second layer, a code "10" indicating that the branch layer is the second layer (a position information code indicating an increment of 1 to the second layer) is provided as shown in FIG. 28. Similarly, a code "10" indicating the second layer is provided to third position information (0,2). If the branch layer determining unit 2704 compares fourth position information (1,0) with the third position information (0,2), it is learned that the value of the position information of the first layer, namely, the scene layer has increased. The branching takes place at the first layer=the scene layer. Therefore, a code "01" (a position information code indicating an increment of 1 to the first layer) is provided to indicate that the branch layer is the first layer. The position information code string obtained by encoding to the end is the one shown in FIG. 28. The position information code string has nothing at the end, more specifically, ends with an end code "11" indicating the end of the code.

FIG. 29 illustrates the position information code corresponding to the branch layer of FIG. 28.

FIG. 30 is a functional block diagram illustrating the schematic structure of a decoding device for position information by differential encoding of the known technique.

First, an initial position information decoding unit 3001 decodes initial position information using an ordinary decoding method. The decoded position information is input to and stored in a preceding position storage unit 3002. A branch layer determining unit 3003 reads a position information code. The branch layer determining unit 3003 determines a branch layer based on the read position information code, and sends the determination results to a differential position information decoding unit 3004. Upon receiving the determination results, the differential position information decoding unit 3004 updates the value of position information stored in the preceding position information storage unit 3002, and outputs the updated position information. The updated position information is stored in the preceding position information storage unit 3002. That process is repeated until the end code is read.

The branch layer determining unit 3003 reads a code "10" with the decoded initial position information (0,0) stored in the preceding position information storage unit 3002. Since the code "10" indicates the branching at the second layer, the differential position information decoding unit 3004 increases the value (0,0) of the second layer by 1, thereby resulting in next position information (0,1). Then, the branch layer determining unit 3003 reads a code "01" with (0,2) decoded and stored in the preceding position information storage unit 3002. Since the code "01" indicates the branching at the first layer, the differential position information decoding unit 3004 increases the position information (0,2) of the first layer which is stored in the preceding position information storage unit 3002 by 1. Since the value of the first layer has changed, position information at a layer below is set to the initial value 0. Next position information (1,0) is thus obtained. That process is performed to the end and decoding is completed when an end code "11" is read.

In these latter days, the above-referenced position information is typically represented by rational numbers. For example, as shown in FIG. 2, all position information is represented by a rational number greater than 0 but smaller than 1, such as a natural number over power of 2 (the denominator being power of 2 and the numerator being a natural number). Such a notation is introduced to make it possible to add a leaf or node optionally between existing leaves or nodes.

For example, as shown in FIG. 26, another shot cannot be added between shot #0 and shot #1 under scene #0 in the current state. To add another shot, the shot number below shot #1 needs to be re-numbered. On the other hand, the position information is represented in a rational number as shown in FIG. 2. If a new shot is added between shot #(1/4) and shot #(1/2) below scene #(1/4), the new shot may be assigned position information 3/8. The new shot is thus added without modifying the existing shots.

DISCLOSURE OF THE INVENTION

The encoding/decoding technique of the position information for differential encoding/decoding a plurality of pieces of position information defined in the aforementioned MPEG-7 at a time is based on the premise that the position information is provided in integer number, and that an interval between adjacent pieces of position information is uniform, namely, 1. Based on this premise, only information relating to the branch layer is encoded as encode information.

The above-mentioned position information represented in the rational number allows the interval between adjacent pieces of position information to be varied optionally. For example, position information next to position 1/4 can be 1/2 or 3/8 or 5/16. The premise established on the position information represented in the aforementioned integer representation is not applicable to the position information in the rational number representation. For this reason, the encoding/decoding technique for a plurality of pieces of position information defined in MPEG-7 has not been directly applicable to the position information in the rational number representation.

The present invention has been developed in view of the above situation, and it is an object of the present invention to provide an encoding device, an encoding method, a decoding device, a decoding method, an encoding program, a decoding program, and a computer-readable recording medium recording the programs for differential encoding/decoding a plurality of leaves and/or nodes of position information represented in rational numbers.

A first invention of the present application relates to an encoding device for encoding a plurality of pieces of position information corresponding to a plurality of leaves and/or nodes at the same layer in a tree structure, and comprises rearranging unit for rearranging, in a predetermined order relationship, the plurality of pieces of position information to be encoded, determining unit for determining, in accordance with the predetermined order relationship, a branch layer of two consecutive pieces of position information from among the plurality of pieces of position information output from the rearranging unit, and encoding unit for outputting a code corresponding to the branch layer.

A second invention of the present application relates to an encoding device for encoding a plurality of pieces of position information corresponding to a plurality of leaves and/or nodes at the same layer in a tree structure, the plurality of pieces of position information to be encoded being arranged in a predetermined order relationship, and comprises determining unit for determining, in accordance with the predetermined order relationship, a branch layer of two consecutive pieces of position information from among the plurality of pieces of position information to be encoded, and encoding unit for outputting a code corresponding to the branch layer.

A third invention of the present application relates to the encoding device according to the first or second invention, wherein the plurality of pieces of position information are rational number position information represented by a rational number, and wherein the predetermined order relationship is determined by the order of magnitude of resolution of the rational number.

A fourth invention of the present application relates to an encoding device for encoding a plurality of pieces of position information corresponding to a plurality of leaves and/or nodes at the same layer in a tree structure, and comprises incremental width determining unit for determining an incremental width of the value of the position information based on the plurality of pieces of position information to be encoded, incremental width encoding unit for encoding the incremental width and outputting the encoded incremental width, determining unit for determining a branch layer of two consecutive pieces of position information from among the plurality of pieces of position information to be encoded, and branch layer encoding unit for outputting a code corresponding to the branch layer.

A fifth invention of the present application relates to the encoding device according to the fourth invention, wherein the plurality of pieces of position information are rational number position information represented by a rational number, and wherein the incremental width is determined on a per branch layer basis so that all the plurality of pieces of position information are encoded.

A sixth invention of the present application relates to the encoding device according to any one of the first through fifth inventions, wherein the tree structure represents search information, and wherein the leaves or nodes corresponding to the plurality of pieces of position information to be encoded correspond to elements of the same type contained in the search information.

A seventh invention of the present application relates to an encoding method for encoding a plurality of pieces of position information corresponding to a plurality of leaves and/or nodes at the same layer in a tree structure, and comprises a rearranging step of rearranging, in accordance with a predetermined order relationship, the plurality of pieces of position information to be encoded, a determining step of determining, in accordance with the predetermined order relationship, a branch layer of two consecutive pieces of position information from among the plurality of pieces of position information output in the rearranging step, and an encoding step of outputting a code corresponding to the branch layer.

An eighth invention of the present application relates to an encoding method for encoding a plurality of pieces of position information corresponding to a plurality of leaves and/or nodes at the same layer in a tree structure, the plurality of pieces of position information to be encoded being arranged in accordance with a predetermined order relationship, and comprises a determining step of determining, in accordance with the predetermined order relationship, a branch layer of two consecutive pieces of position information from among the plurality of pieces of position information to be encoded, and an encoding step of outputting a code corresponding to the branch layer.

A ninth invention of the present application relates to the encoding method according to the seventh or eighth invention, wherein the plurality of pieces of position information are rational number position information represented by a rational number, and wherein the predetermined order relationship is determined by the order of magnitude of resolution of the rational number.

A tenth invention of the present application relates to an encoding method for encoding a plurality of pieces of position information corresponding to a plurality of leaves and/or nodes at the same layer in a tree structure, and comprises an incremental width determining step of determining an incremental width of the value of the position information based on the plurality of pieces of position information to be encoded, an incremental width encoding step of encoding the incremental width and outputting the encoded incremental width, a determining step of determining a branch layer of two consecutive pieces of position information from among the plurality of pieces of position information to be encoded, and a branch layer encoding step of outputting a code corresponding to the branch layer.

An eleventh invention of the present application relates to the encoding method according to the tenth invention, wherein the plurality of pieces of position information are rational number position information represented by a rational number, and wherein the incremental width is determined on a per branch layer basis so that all the plurality of pieces of position information are encoded.

A twelfth invention of the present application relates to the encoding method according to any one of the seventh through eleventh inventions, wherein the tree structure represents search information, and wherein the leaves or nodes corresponding to the plurality of pieces of position information to be encoded correspond to elements of the same type contained in the search information.

A thirteenth invention of the present application relates to a decoding device for decoding a string of position information code composed of a plurality of pieces of encoded position information corresponding to a plurality of leaves and/or nodes at the same layer in a tree structure, and comprises storage unit for successively storing decoded position information, determining unit for determining a branch layer of two consecutive pieces of position information based on the position information code, and decoding unit for updating the value of the position information, stored in the storage unit, corresponding to the branch layer by one notch in accordance with a predetermined order relationship.

A fourteenth invention of the present application further comprises rearranging unit for rearranging the plurality of pieces of decoded position information in accordance with the order of magnitude from large to small.

A fifteenth invention of the present application relates to the decoding device according to the fourteenth invention, wherein the rearranging unit further comprises calculating unit for calculating a serial number assigned to each piece of the decoded position information, the serial number representing the order of magnitude.

A sixteenth invention of the present application relates to the decoding device according to any one of the thirteen through fifteenth inventions, wherein the plurality of pieces of position information are rational number position information represented by a rational number, and wherein the predetermined order relationship is determined by the order of magnitude of resolution of the rational number.

A seventeenth invention of the present application relates to a decoding device for decoding a string of position information code composed of a plurality of pieces of encoded position information corresponding to a plurality of leaves and/or nodes at the same layer in a tree structure, and comprises incremental width decoding unit for decoding an incremental width of the value of the position information, storage unit for successively storing the decoded position information, determining unit for determining a branch layer of two consecutive pieces of position information based on the position information code, and position information decoding unit for updating the value of the position information, stored in the storage unit, corresponding to the branch layer by the incremental width.

An eighteenth invention of the present application relates to the decoding device according to any one of the thirteenth through seventeenth inventions, wherein the tree structure represents search information, and wherein the leaves or nodes corresponding to the position information to be decoded correspond to elements of the same type contained in the search information.

A nineteenth invention of the present application relates to a decoding method for decoding a string of position information code composed of a plurality of pieces of encoded position information corresponding to a plurality of leaves and/or nodes at the same layer in a tree structure, and comprises a storage step of successively storing decoded position information, a determining step of determining a branch layer of two consecutive pieces of position information based on the position information code, and a decoding step of updating the value of the position information, stored in the storage step, corresponding to the branch layer by one notch in accordance with a predetermined order relationship.

A twentieth invention of the present application relates to the decoding method according to the nineteenth invention, further comprises a rearranging step of rearranging the plurality of pieces of decoded position information in accordance with the order of magnitude.

A twenty-first invention of the present application relates to the decoding method according to the twentieth invention, wherein the rearranging step further comprises a calculating step of calculating a serial number assigned to each piece of decoded position information, the serial number representing the order of magnitude.

A twenty-second invention of the present application relates to the decoding method according to any one of the nineteenth through twenty-first inventions, wherein the plurality of pieces of position information are rational number position information represented by a rational number, and wherein the predetermined order relationship is determined by the order of magnitude of resolution of the rational number.

A twenty-third invention of the present application relates to a decoding method for decoding a string of position information code composed of a plurality of pieces of encoded position information corresponding to a plurality of leaves and/or nodes at the same layer in a tree structure, and comprises an incremental width decoding step of decoding an incremental width of the value of the position information, a storage step of successively storing the decoded position information, a determining step of determining a branch layer of two consecutive pieces of position information based on the position information code, and a position information decoding step of updating the value of the position information, stored in the storage step, corresponding to the branch layer by the incremental width.

A twenty-fourth invention of the present application relates to the decoding method according to any one of the nineteenth through twenty-third inventions, wherein the tree structure represents search information, and wherein the leaves or nodes corresponding to the position information to be decoded correspond to elements of the same type contained in the search information.

A twenty-fifth invention of the present application relates to a program for causing a computer to function as the encoding device according to any one of the first through sixth inventions.

A twenty-sixth invention of the present application relates to a program for causing a computer to perform the encoding method according to any one of the seventh through twelfth inventions.

A twenty-seventh invention of the present application relates to a program for causing a computer to function as the decoding device according to any one of the thirteen through eighteenth inventions.

A twenty-eighth invention of the present application relates to a program for causing a computer to perform the decoding method according to any one of the nineteenth through twenty-fourth inventions.

A twenty-ninth invention of the present application relates to a computer-readable recording medium storing the program according to any one of the twenty-fifth through twenty-eighth inventions.

In accordance with the present invention, a plurality of pieces of position information are represented in rational numbers, the order relationship of which is not uniquely determined in terms of the order of magnitude. A new order relationship of predetermined values of the plurality of pieces of position information is set up, and the plurality of pieces of position information are rearranged in accordance with the new order relationship. The plurality of pieces of position information are thus encoded/decoded using the differential encoding technique in the same way as the position information in the integer representation is encoded/decoded. Even when the plurality of pieces of position information to be encoded/decoded are not serial in the new order relationship subsequent to the rearrangement, the plurality of pieces of position information can be encoded/decoded using the differential encoding technique by notifying of information indicative of deficiency position.

In accordance with the present invention, a plurality of pieces of position information are represented in rational numbers, the order relationship of which is not uniquely determined in terms of the order of magnitude. The incremental width of the value in terms of the order of magnitude is determined, and encoded as a code of position information. The plurality of pieces of position information are thus encoded/decoded using the differential encoding technique in the same way as the position information in the integer representation is encoded/decoded. A deficiency position, which is originally non-existent, may take place when the value is increased by the incremental width of the given value. Even in such a case, the plurality of pieces of position information can be encoded/decoded using the differential encoding technique by notifying of information indicative of deficiency position.

BRIEF DESCRIPTION OF THE DRAWINGS

FIG. 6 illustrates the position information code of FIG. 5 used in the example of the position information encoding device in accordance with the first embodiment of the present invention.

FIG. 14 illustrates an example of summing order information that is handled by the position information decoding device that rearranges the position information during decoding in accordance with the first embodiment of the present invention.

FIG. 15 illustrates another example of summing order information that is handled by the position information decoding device that rearranges the position information during decoding in accordance with the first embodiment of the present invention.

FIG. 29 illustrates the position information code of FIG. 28.

PREFERRED EMBODIMENTS OF THE INVENTION

First Embodiment

A position information encoding device of a first embodiment of the present invention is described below with reference to FIGS. 1 through 9.

Figure 1:
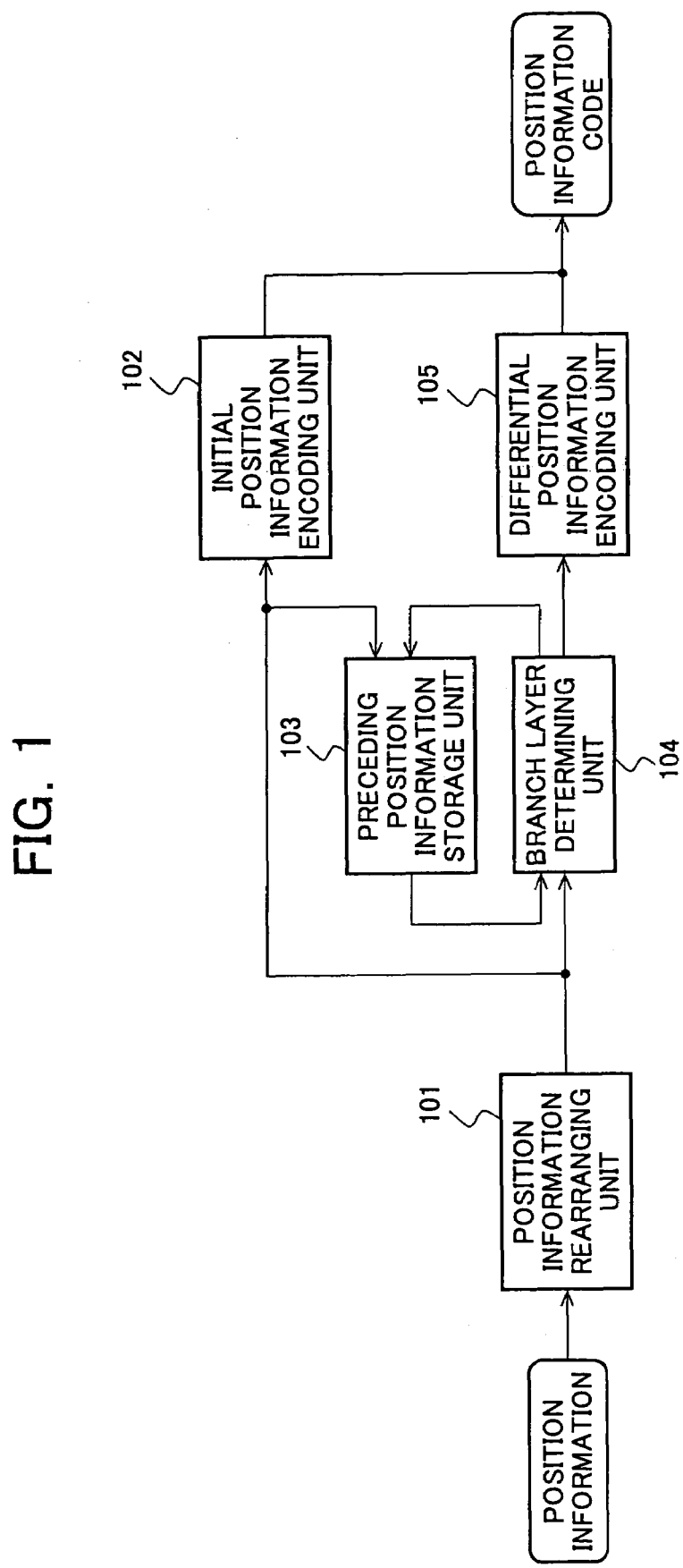
FIG. 1 is a functional block diagram illustrating the schematic structure of an encoding device for encoding position information in accordance with a first embodiment of the present invention.

FIG. 1 is a functional block diagram illustrating the schematic structure of the position information encoding device in accordance with the first embodiment of the present invention.

The position information encoding device of the first embodiment of the present invention comprises a position information rearranging unit 101, an initial position information encoding unit 102, a preceding position information storage unit 103, a branch layer determining unit 104, and a differential position information encoding unit 105. As previously discussed, element type information and position information are separately encoded in accordance with MPEG-7, and are handled together with search data. The present invention relates to the encoding of the position information. The encoding of the position information in accordance with the present invention is not limited to the encoding specified by MPEG-7. The present invention is applicable to an encoding device that performs an encoding process including position information encoding.

Figure 2:
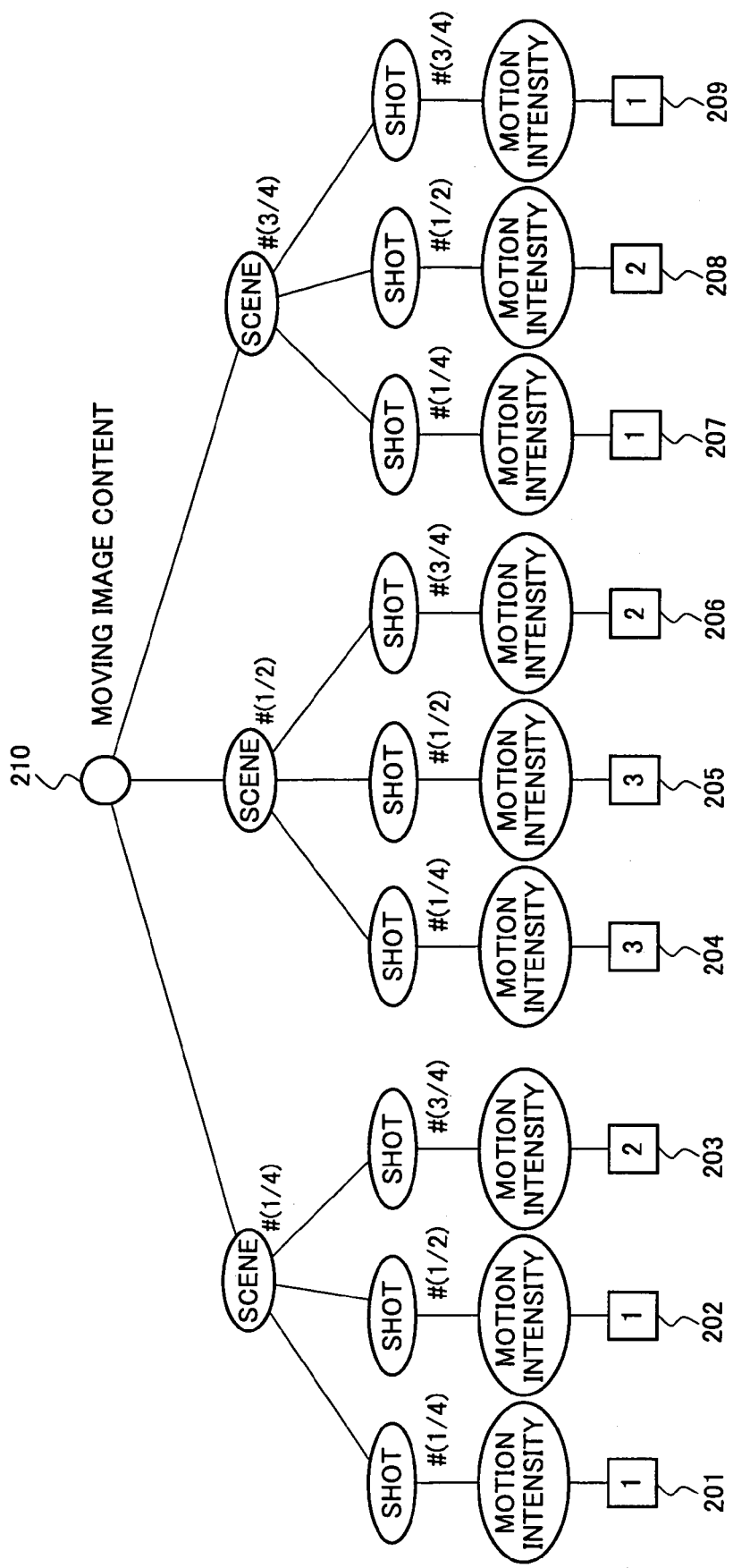
FIG. 2 illustrates an example of search information having a tree structure with the position information represented in a rational number.

FIG. 2 illustrates an example of search information having a tree structure with the position information represented in a rational number.

As shown in FIG. 2, the present embodiment encodes and decodes position information in a tree structure represented in rational numbers. It should be noted that the encoding/decoding device and method of the present invention are also applicable to the position information in a tree structure represented in an integer number. FIG. 2 illustrates the search information corresponding to a moving image content. The moving image content 210 is composed of three scenes, each scene is composed of three shots, and each shot is provided with search data representing a motion intensity.

Figure 3:
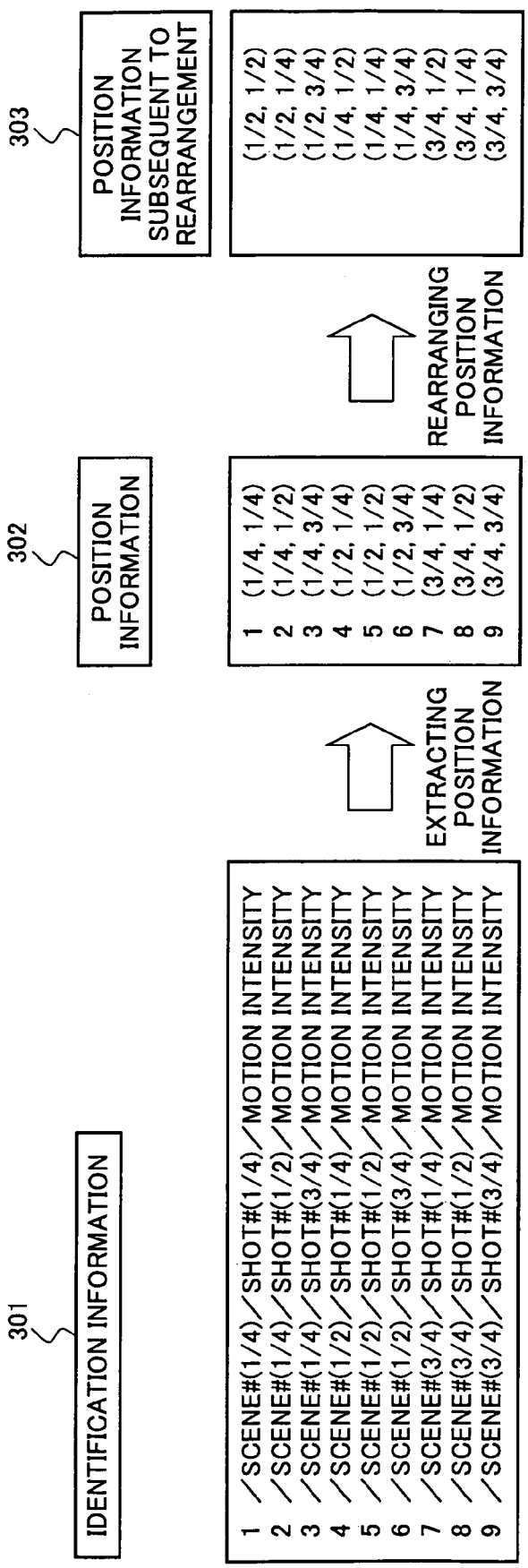
FIG. 3 illustrates identification information corresponding to each data of the search information of FIG. 2, position information extracted from the identification information, and position information rearranged from the extracted position information in accordance with the first embodiment of the present invention.

FIG. 3 illustrates identification information corresponding to each data of the search information of FIG. 2, position information extracted from the identification information, and position information rearranged from the extracted position information in accordance with the first embodiment of the present invention. Identification information 301 corresponding to each search data 201-209 contained in the search information of FIG. 2 and position information 302 extracted from the identification information 301 are shown in FIG. 3.

The position information that undergoes the encoding and decoding operations of the present invention is contained in a plurality of pieces of identification information identical in element type information but different in position information only as shown in FIG. 3. FIG. 2 illustrates one example of the search information of the moving image content. Actual moving image content has a complex layer structure in which one scene is recursively decomposed into a plurality of scenes, each scene further being decomposed into a plurality of scenes. The search information has often complex layer structure accordingly. The search data may be attached not only to each shot but also to each scene or the entire moving image content. The position information encoding and decoding process of the present invention is also applicable to search information having such a complex layer structure. As shown in FIG. 3, position information corresponding to the search data=leaf is extracted. The same is true of nodes. More specifically, if a plurality of pieces of identification information obtained in accordance with a plurality of search data=leaves or a plurality of nodes, contained in the search information, are formed of the same element type information but are different in position information only, the position information encoding and decoding process of the present invention is applicable to the plurality of pieces of identification information. The position information encoding and decoding process of the present invention is applicable in principle to search information of multi-media contents such as an audio content or text, other than moving image content, or information other than the search information, as long as these pieces of information have a tree structure.

The most unique functional structure of the position information encoding device of the present embodiment of FIG. 1 lies in the position information rearranging unit 101 arranged prior to an encoding stage. The process of the position information rearranging unit 101 is described below.

If each position information to be encoded is represented in a rational number, the known differential encoding cannot be performed on the position information. This is because when a first piece of position information is followed by a second piece of position information in the position information represented in the rational number, the value of the second piece of position information cannot be uniquely identified from the value of the first piece. If in the integer number representation, the value of next position information is automatically uniquely determined, for example, 0 is followed by 1, 1 is followed by 2, and so on. If in the rational number representation on the other hand, position information 1/4 could be followed by 1/2 or 3/8 or 5/16.

Figures 4A, 4B:
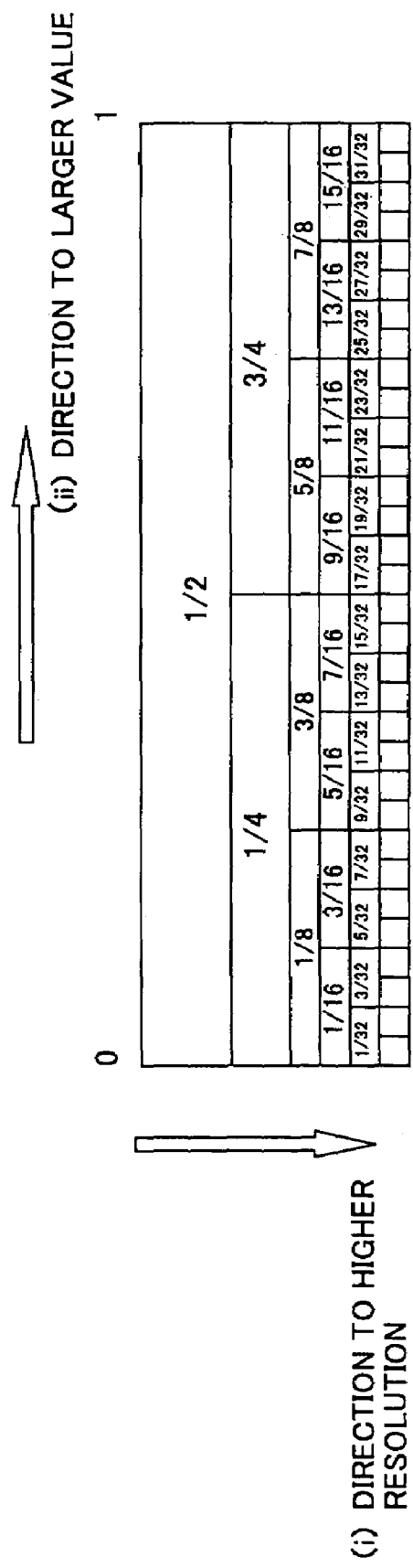
FIG. 4A illustrates the order relationship of the value of the position information represented in rational numbers in accordance with the first embodiment of the present invention.
FIG. 4B illustrates a determination method for determining the order relationship of FIG. 4A in accordance with the first embodiment of the present invention.

FIGS. 4A and 4B illustrate the order relationship of the value of the position information represented in rational numbers and the determination method of the order relationship in accordance with the first embodiment of the present invention.

To overcome the above-mentioned drawback, a predetermined order relationship is set up for the value of the position information represented in a rational number in accordance with the present invention. In this example, the position information represented in a rational number of "a natural number over power of 2 (the denominator being power of 2 and the numerator being a natural number)" is used. The order relationship of the value of the position information is defined as "1/2→1/4→3/4→1/8→3/8→5/8→7/8→1/16 . . . " (see FIG. 4A).

This ordering is performed as shown in FIG. 4B (i) "a natural number over power of 2" greater than 0 but smaller than 1 are sequenced from low resolution to high resolution, and (ii) within the same resolution, the value is sequenced in the order of magnitude from a small value to a large value. The resolution to the rational number, namely, "a natural number over power of 2" has the following meaning. A value within a range from 0 to 1 is halved, the halved value is further halved, and so on to determine a rational number. The number of divisions is the resolution. A rational number obtained from a smaller number of divisions has lower resolution, while a rational number obtained from a large number of divisions has higher resolution. Simply stated, the value of power of 2 as the denominator corresponds to the resolution. In this definition, the position information is sequenced in the order of the rational number starting with an initial value 1/2 to higher resolution. Individual rational numbers that are not uniquely identified by the relationship of magnitude are clearly defined, in other words, a next value following a first value is distinctly defined.

The position information rearranging unit 101 rearranges each position information in accordance with the newly defined order relationship of FIG. 4A. Position information 303 of FIG. 3 is obtained by rearranging position information 302 of FIG. 3 in accordance with the order relationship of FIG. 4A. The rearrangement is performed based on the value of the position information assigned to each layer so that the position information is lined at an upper layer in the order relationship of FIG. 4A. The position information having the same values within the same layer are rearranged in the order relationship of FIG. 4A at a layer below the first layer. This operation is recursively performed. Rather than comparing the values of the position information at each layer, the values of position information at all layers in the leaves or the nodes are handled together to rearrange the position information. For example, the relationship of magnitude between the position information at one leaf or node and the position information at another leaf or node is defined. In accordance with the relationship of magnitude, an existing sort algorithm such as the quicksort is applied to the position information of the leaves or nodes to rearrange the position information. Any rearrangement method is perfectly acceptable as long as the rearrangement method executes a rearrangement similar to the above method. The present invention is not limited to the above-referenced rearrangement methods.

In accordance with the present embodiment, all the position information are extracted and arranged in the order of magnitude. The position information is then rearranged. The position information rearranging unit 101 does not necessarily perform the above-referenced step-by-step process. For example, at or prior to the stage of extracting the position information, the search data is successively extracted in accordance with the order of FIG. 4A when the search data to be treated is selected and extracted in a group. Such a process is broadly considered as one of rearrangement processes performed by the position information rearranging unit 101.

After the position information rearranging unit 101 rearranges the position information, the differential encoding is performed in the same process as the known encoding process of the position information represented in the integer number. The initial position information encoding unit 102 encodes initial position information subsequent to rearrangement in an ordinary method rather than the difference technique. The initial position information is stored in the preceding position information storage unit 103 to be used in encoding next position information.

Figure 5:
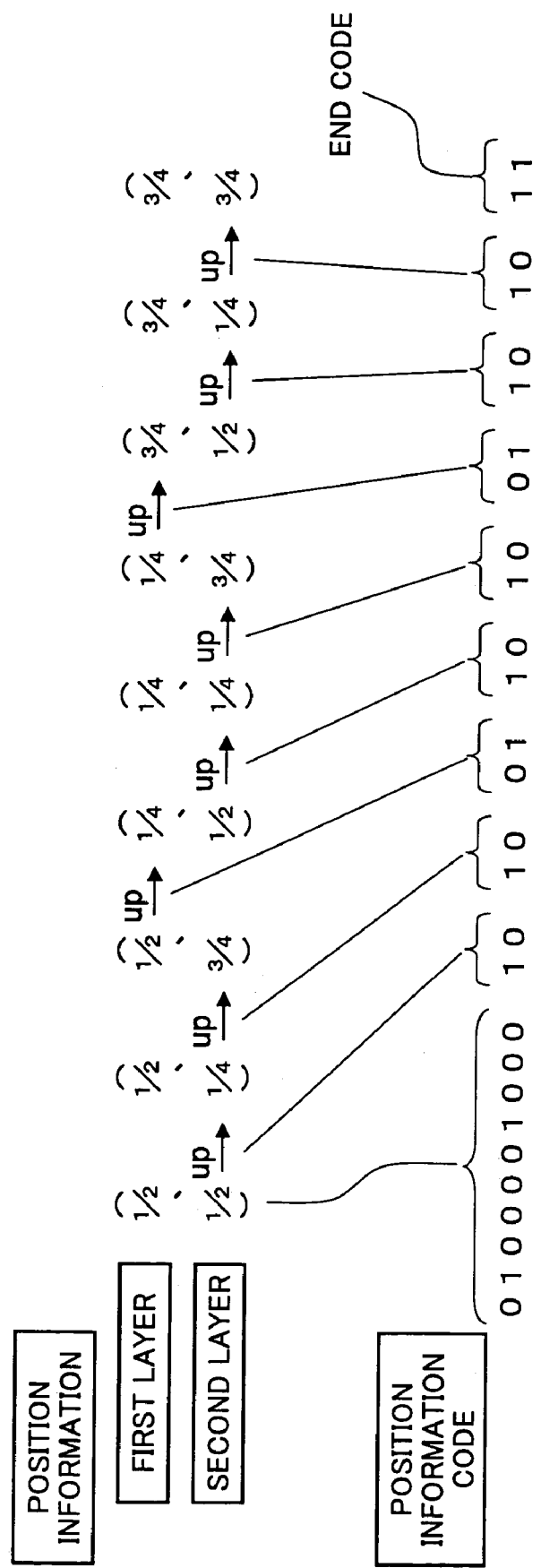
FIG. 5 illustrates an example of the position information to be encoded by and a position information code string encoded by one example of the position information encoding device in accordance with the first embodiment of the present invention.

FIG. 5 illustrates an example of the position information to be encoded by and a position information code string encoded by one example of the position information encoding device in accordance with the first embodiment of the present invention.

The operation of the position information encoding device is described below with reference to FIG. 5 based on the rearranged position information identical to that of FIG. 3 and the position information code string that is obtained by encoding the rearranged position information.

The initial position information (1/2, 1/2) subsequent to the rearrangement has no preceding position information required to perform the differential encoding, and is thus encoded using an ordinary method. As shown in FIG. 5, the encoding process is performed using 10 bits=5 bits×2 with 5 bits per variable. In the present invention, no further discussion is provided concerning the encoding method relating to the initial position information.

The preceding position information storage unit 103 records the position information processed in a preceding cycle, and outputs and provides the recorded position information to encode next position information. As shown in FIG. 5, position information to be encoded subsequent to (1/2,1/2) is (1/2,1/4). When (1/2,1/4) is encoded, the preceding position information storage unit 103 stores position information (1/2,1/2).

The branch layer determining unit 104 compares input position information with the position information stored in the preceding position information storage unit 103, determines the layer at which the two pieces of position information have branched off from each other, and outputs the determination results to the differential position information encoding unit 105. Based on the determination results output from the branch layer determining unit 104, the differential position information encoding unit 105 outputs a position information code corresponding to the branch layer.

Two pieces of position information, namely, the input position information and the position information stored in the preceding position information storage unit 103 are traced along paths from the root to leaves in the tree of the search information. The paths branch off into different nodes or leaves at the branch layer. Simply stated, the value of the position information is traced from an upper layer to a lower layer as shown in FIG. 5, and the branch layer is the one at which the value of the position information first changes.

For example, if the input position information is (1/2,1/4), and the position information stored in the preceding position information storage unit 103 is (1/2,1/2), the values are identical at the first layer, and the values are different at the second layer. This means that the branching takes place at the second layer, namely, the shot layer, and that the values are identical at the upper layer, namely, at the scene layer. The branch layer determining unit 104 thus outputs information indicative of the second layer as the determination results.

More precisely, it is necessary to check that the position information at the branch layer, namely, the position information at the shot layer is updated correctly from 1/2 to 1/2 by one notch in accordance with the order relationship of FIG. 4A. If it is determined that the updating is not correct, the operation to be performed is described below in another example with reference to FIGS. 7 through 9.

If the input position information is (1/4,1/2) and the position information stored in the preceding position information storage unit 103 is (1/2,3/4), these two pieces of position information are already different at the first layer. This means that the branching takes place at the first layer, namely, the scene layer. The branch layer determining unit 104 thus outputs information indicative of the first layer as the determination results.

More precisely, it is necessary to check that the position information at the branch layer, namely, the position information at the scene layer is updated correctly from 1/2 to 1/4 by one notch in the order relationship of FIG. 4A. Since the branching takes place at the scene layer, it is necessary to check that the position information at a layer lower than the scene layer, namely, the shot layer takes an initial value 1/2. Since the branching takes place at the upper layer, namely, at the different node, the layer below the node must be assigned new position information starting with an initial value to its node or leaf. The operation to be performed when the position information at the shot layer is other than the initial value 1/2 is also described below in another example with reference to FIGS. 7 through 9.

Based on the determination results output from the branch layer determining unit 104, the differential position information encoding unit 105 outputs a position information code corresponding to the branch layer. If the position information to be encoded is (1/2,1/4) and the preceding position information is (1/2,1/2) as shown in FIG. 5, the differential position information encoding unit 105 outputs, in response to the determination results from the branch layer determining unit 104, a position information code "10" indicating that the second layer is the branch layer. Since the branch layer is the second layer, the position information code "10" means that the value of the position information at the second layer is increased by one notch in accordance with the order relationship of FIG. 4A during decoding. Alternatively, if the position information to be encoded is (1/4,1/2) and the preceding position information is (1/2,3/4), the differential position information encoding unit 105 outputs, in response to the determination results of the branch layer determining unit 104, a position information code "01" indicating that the branch layer is the first layer. Since the first layer is the branch layer, the position information code "01" means that the value of the position information at the first layer is increased by one notch in accordance with the order relationship of FIG. 4A during decoding, and that the value of the position information at a layer below the first layer, namely, the second layer is set to the initial value 1/2 in the order relationship of FIG. 4A.

FIG. 6 illustrates the position information code of FIG. 5 used in the example of the position information encoding device in accordance with the first embodiment of the present invention.

The position information code shown in FIG. 6 indicates the layer at which the tree corresponding to the encoded position information and position information processed prior to the first position information branches off. The bit length of the code is determined by the number of branchable layers in the tree structure. The number of pieces of position information contained in the identification information attached to the search data, namely, the number of elements of the search information taking the position information is the number of branchable layers.

When the position information contained in the identification information of the search data is encoded, the element type information is encoded together with the position information. The encoded element type information is typically stored or transmitted together with the encoded position information. Therefore, by referencing the element type information, the number of branchable layers in the encoding and decoding operations can be learned. Without the need for notifying the bit length of the code, the bit length of the code in the encoding and decoding operations can be learned. On the other hand, when the position information unassociated with information indicative of the number of branchable layers, such as the element type information, is encoded, information indicative of the bit length of the code may be generated and then stored or transmitted together with the encoded position information. The determination of the bit length of the code is performed in a process separate from the encoding process of the encoding device of FIG. 1 and thus is not shown.

The number of branchable layers (the number of elements having position information) is 2 in the identification information 301 of FIG. 3. The code has a representable minimum bit length of 4=<number of layers> of 2+<deficiency codes> of 1+<end code> of 1, namely, as a 2 bit code.

The deficiency code "00" is a special code indicating that the position information contains a missing portion. A deficiency code in the position information in the identification information corresponding to the search data means that no corresponding search data is available at a location updated by a position information code following the deficiency code. The deficiency code will be described later in detail with reference to FIGS. 7 through 9.

After last position information to be encoded, namely, position information (3/4,3/4) of FIG. 5 is encoded and output, the end code "11" indicating that no further position information is available is output and the encoding process ends.

All position information of data 201-209 contained in the tree is encoded in this example. However, all position information contained in the tree is not always encoded. A portion of the tree structure may be extracted for encoding. Position information in the tree structure in later time can be extracted. For example, in order to encode only the second and third scenes other than the first scene of FIG. 2, the initial position information is replaced with the front of the second scene. Position information in earlier time only in the tree structure can be encoded. For example, in order to encode only the first and second scenes other than the third scene of FIG. 2, the end code is issued to end the encoding operation at the moment the position information contained in the first and second scenes is encoded. To extract the tree structure intermediate time, these steps are combined. The encoding front position to be modified and the encoding end position that is forced by the end code can be set at any location in the tree structure.

The position information encoding of the tree structure having a missing portion is described below with reference to FIGS. 7 through 9.

Figure 7:
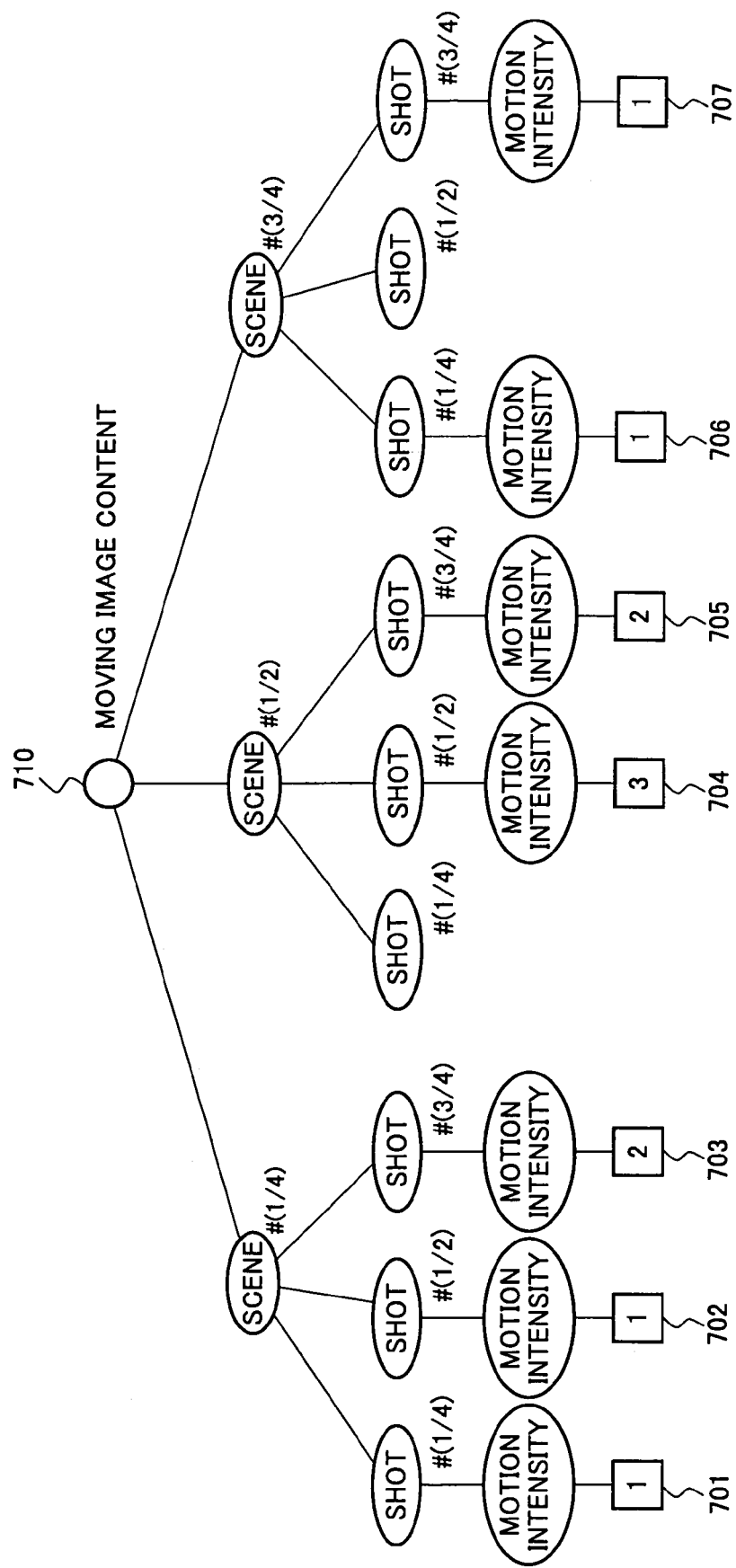
FIG. 7 illustrates another example of the search information having a tree structure with the position information represented in a rational number.
Figure 8:
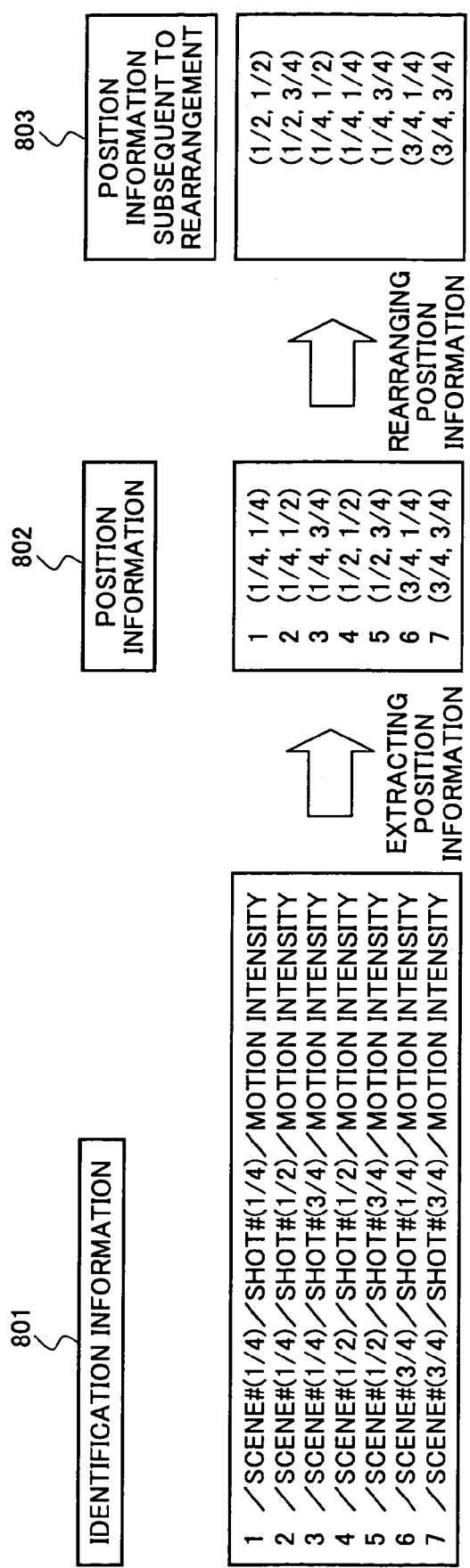
FIG. 8 illustrates identification information corresponding to each data of the search information of FIG. 7, position information extracted from the identification information, and position information rearranged from the extracted position information in accordance with the first embodiment of the present invention.

FIG. 7 illustrates another example of the search information having a tree structure with the position information represented in a rational number. FIG. 8 illustrates identification information corresponding to each data of the search information of FIG. 7, position information extracted from the identification information, and position information rearranged from the extracted position information in accordance with the first embodiment of the present invention. FIG. 9 illustrates another example of position information to be encoded by and a position information code string encoded by one example of the position information encoding device in accordance with the first embodiment of the present invention.

Position information of data 701-707 contained in the search information corresponding to the moving image content 710 of FIG. 7 is encoded. The search information of FIG. 7 has missing portions, namely, has no search data representing the motion intensity at shots corresponding to position information (1/2,1/4) and (3/4,1/2). As FIG. 3, FIG. 8 illustrates identification information 801 corresponding to data 701-707, position information 802 extracted from the identification information, and position information 803 into which the position information 802 is rearranged in accordance with the order relationship of FIG. 4A. FIG. 9 illustrates the rearranged position information which is identical with that of FIG. 8 and the generated position information code string.

The encoding operation of the position information (1/2, 3/4) is described below with reference to FIG. 9.

At the moment the branch layer determining unit 104 receives the position information (1/2,3/4), the preceding position information storage unit 103 stores position information (1/2,1/2) processed at the preceding cycle. The branch layer is determined based on this preceding position information.

The two pieces of position information (1/2,1/2) and (1/2, 3/4) are equal in the first layer value but different in the second layer value. This means that the branching takes place at the second layer. It is determined whether the value of the position information at the second layer is updated by one notch in accordance with the order relationship of FIG. 4A. In the order relationship of FIG. 4A, 1/2 is followed by 1/4. In practice, however, the input position information is 3/4. This means that an empty position, namely, a missing portion is present. The branch layer determining unit 104 outputs, to the differential position information encoding unit 105, information indicating that the branch layer is the second layer, and information indicating that the missing portion is present. The branch layer determining unit 104 also generates position information (1/2,1/4) subsequent to (1/2,1/2) on the assumption that no missing portion occurs, and transfers the position information (1/2,1/4) to the preceding position information storage unit 103 for recording. Under this state, the position information (1/2,3/4) is encoded again.

Upon receiving the determination results from the branch layer determining unit 104, the differential position information encoding unit 105 learns that the missing portion is contained and that the branch layer is the second layer. The differential position information encoding unit 105 then outputs the corresponding deficiency code "00" and the position information code "10".

The preceding position information storage unit 103 stores (1/2,1/4) that is generated by the branch layer determining unit 104 at the moment (1/2,3/4) is encoded again. Two pieces of position information (1/2,1/4) and (1/2,3/4) are equal in the value of the first layer but different in the value of the second layer. This means that the branching takes place at the second layer. It is further learned that the value of the position information at the second layer is 3/4 that is correctly shifted from 1/4 by one notch in accordance with the order relationship of FIG. 4A. The branch layer determining unit 104 thus transfers, to the differential position information encoding unit 105, only information indicating that the branch layer is the second layer. Based on the determination results from the branch layer determining unit 104, the differential position information encoding unit 105 outputs the position information code "10" indicative of the second layer.

Figure 9:
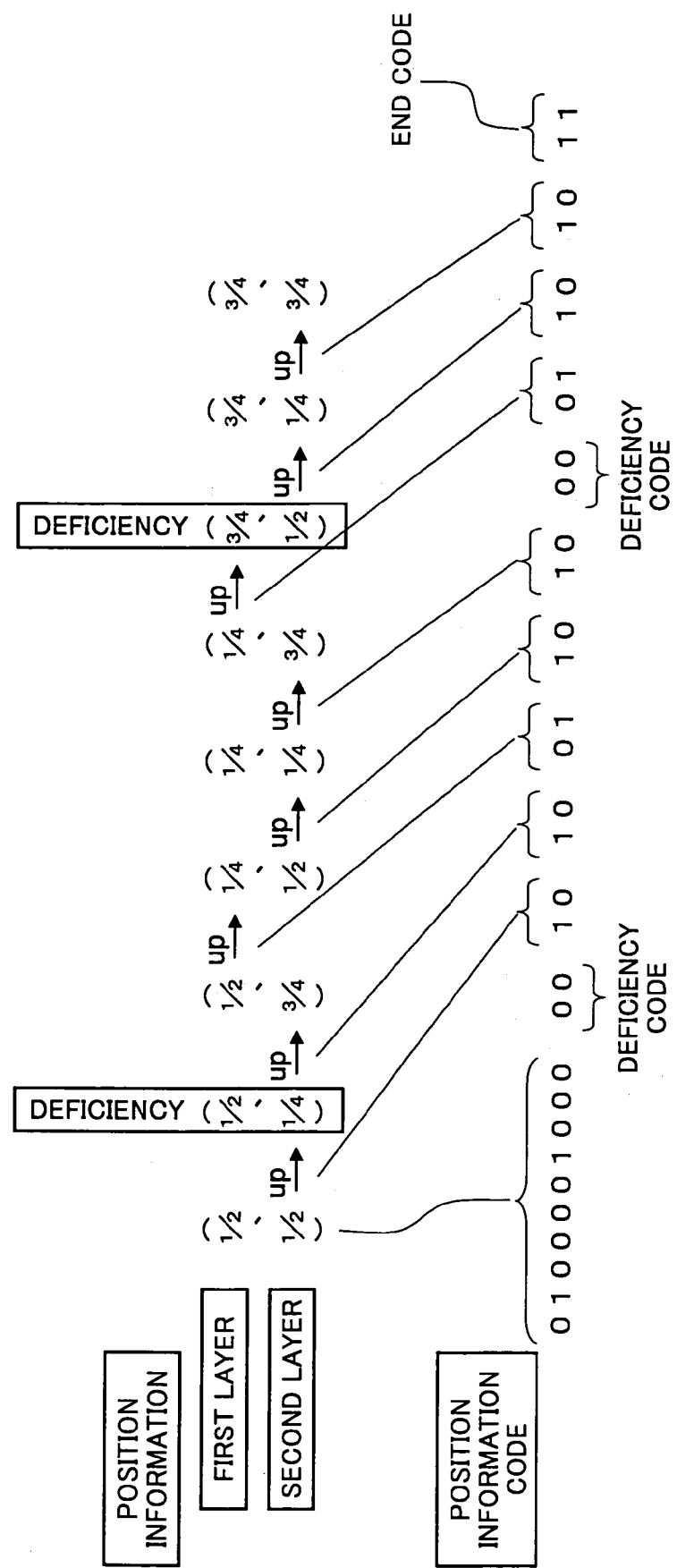
FIG. 9 illustrates another example of position information to be encoded by and a position information code string encoded by one example of the position information encoding device in accordance with the first embodiment of the present invention.

FIG. 9 illustrates the operation of encoding position information (3/4,1/4).

The preceding position information storage unit 103 stores the position information (1/4,3/4). processed in a preceding step at the moment the branch layer determining unit 104 receives the position information (3/4,1/4).

Since two pieces of position information (1/4,3/4) and (3/4,3/4) are different in the value of the first layer, the branching takes place at the first layer. It is thus learned that the position information at the first layer is 3/4 that is correctly shifted from 1/4 by one notch in accordance with the order relationship of FIG. 4A. It is here determined whether the value of the position information at the second layer becomes the initial value 1/2 in accordance with the order relationship of FIG. 4A. The input position information of 1/4 shows that the position information is deficient or missing. The branch layer determining unit 104 outputs, to the differential position information encoding unit 105, information indicating that the branch layer is the first layer, and information indicating that the missing portion is contained. At the same time, the branch layer determining unit 104 generates position information (3/4,1/2) on the assumption that no deficiency took place, and transfers the position information (3/4,1/2) to the preceding position information storage unit 103 for recording. Under this state, the position information (3/4,1/4) is encoded again.

Based on the determination results from the branch layer determining unit 104, the differential position information encoding unit 105 learns that the deficiency is contained and that the branch layer is the first layer, and outputs the corresponding deficiency code "00" and the position information code "01".

The position information, which is stored in the preceding position information storage unit 103 at the moment the position information (3/4,1/4) is encoded again, is the (3/4,1/2) generated by the branch layer determining unit 104. Since two pieces of position information (3/4,1/2) and (3/4,1/4) are equal in the value of the first layer but different in the value of the second layer, the branching takes place at the second layer. It is also learned that the value of the position information at the second layer is 1/4, correctly shifted from 1/2 by one notch in accordance with the order relationship of FIG. 4A. The branch layer determining unit 104 sends, to the differential position information encoding unit 105, information indicating that the branch layer is the second layer. Based on the determination results from the branch layer determining unit 104, the differential position information encoding unit 105 outputs the position information code "10" indicative of the second layer.

In this way, the position information having the tree structure even with a deficiency can be difference encoded. Further, by using the deficiency code actively, the search data of the same type contained in the search information having the tree structure which is optionally selected can be grouped, or partly trimmed before being transmitted or recorded.

Figure 10:
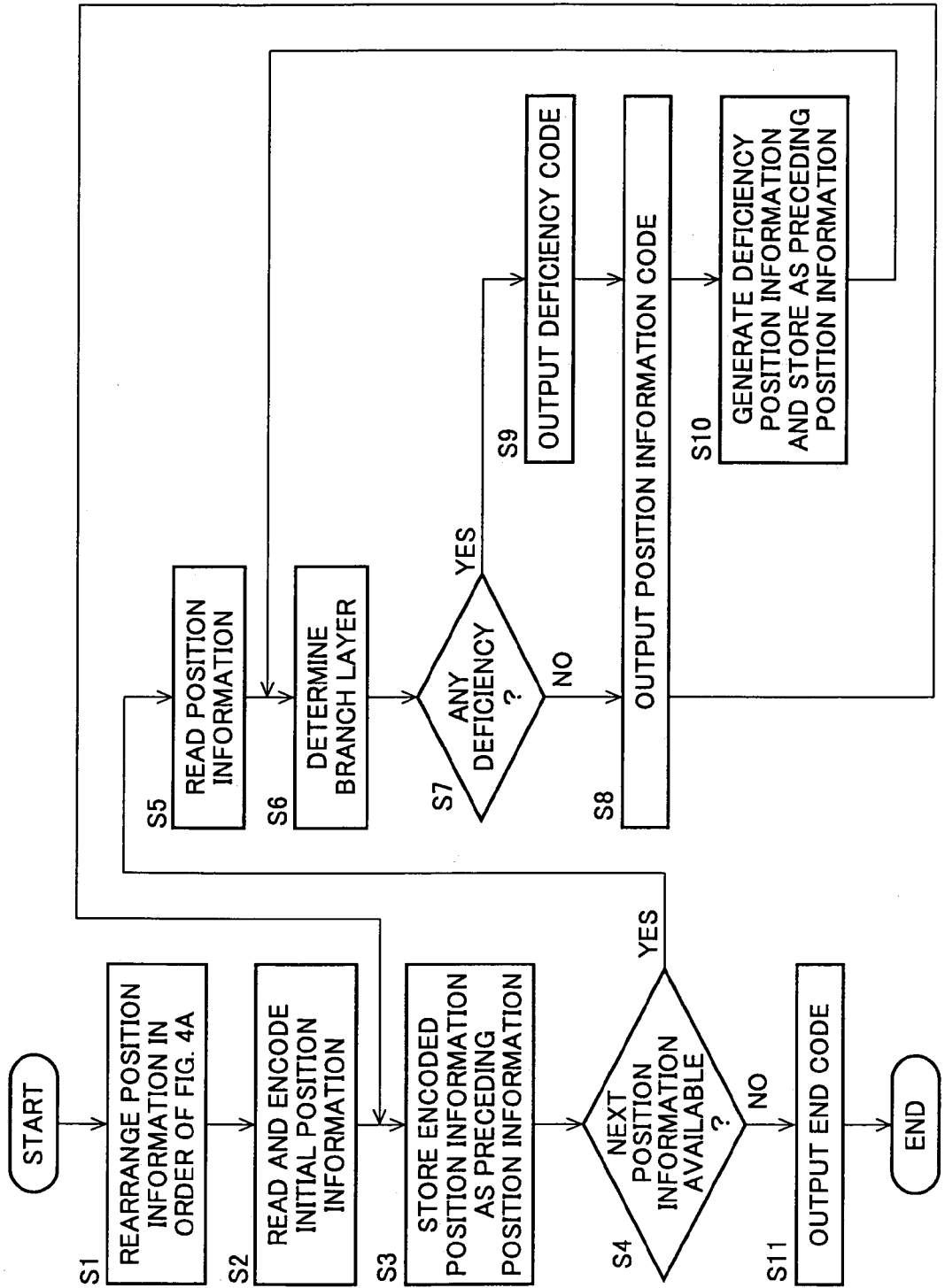
FIG. 10 is a flowchart illustrating the position information encoding method in accordance with the first embodiment of the present invention.

FIG. 10 is a flowchart illustrating the position information decoding method in accordance with the first embodiment of the present invention.

The position information encoding method of the first embodiment of the present invention comprises a position information rearranging step (step S1), an initial position information encoding step (step S2), a preceding position information storage step (step S3), a branch layer determining step (step S6), and a differential position information encoding step (step S8). The encoding method of the first embodiment of the present invention also relates to an encoding process of encoding the position information. The present invention can be embodied as an encoding process including a position information encoding process.

First, a plurality of pieces of position information to be encoded are arranged in accordance with the order relationship of FIG. 4A (step S1). The rearranged initial position information is encoded through an ordinary method (step S2). At the same time, the initial position information is stored as the preceding position information for use in encoding next position information (step S3).

It is then determined whether next position information to be encoded is available (step S4). If it is determined that the next position information to be encoded is available, the position information to be encoded is read (step S5). The read position information to be encoded is compared with preceding position information stored to determine the branch layer (step S6). At this time, it is determined whether a deficiency is contained between the two pieces of position information (step S7). As previously discussed in connection with the encoding device, the deficiency determination is performed depending on whether the position information follows the order relationship of FIG. 4A.

If no deficiency is present, the position information code corresponding to the branch layer is output (step S8), the encoded position information is stored again as preceding position information (step S3), and the same process is repeated.

If a deficiency is present, a deficiency code is output (step S9), and then a position information code corresponding to the branch layer is output (step S8) Next position information, which could be obtained on the assumption that no deficiency was contained, is generated from the position information stored as the preceding position information. That deficiency position information is stored as the preceding position information (step S10). A branch layer is then determined again based on the preceding position information and already read position information to be encoded (step S6). If the position information to be encoded is determined as having a deficiency, the same position information is encoded again. Similarly, the presence or absence of deficiency is determined. If it is determined that a deficiency is contained, a step of outputting the deficiency code (step S9) and subsequent steps are performed. If it is determined that no deficiency is contained, the position information code is output (step S8), and the encoded position information is encoded as preceding position information (step S3).

If it is determined in step S4 that no position information to be encoded is available, an end code is output (step S11), and the encoding process ends.

The encoding efficiency of encoding the position information represented in the rational number using the encoding device and the encoding method in accordance with the first embodiment of the present invention becomes maximized if no deficiency is contained in the position information, in other words, if the values of the plurality of pieces of position information to be encoded are represented in rational numbers and are consecutively provided in accordance with the predetermined rational number order, namely, the order relationship of FIG. 4A. It is thus contemplated that the order relationship of the predetermined rational number of FIG. 4A is used when a plurality of pieces of search data (leaves or nodes) having the same element type information are assigned position information.

If the number of pieces of search data (leaves or nodes) having the same element type information to be assigned position information is M, M values are selected from the front in accordance with the order relationship of FIG. 4A, and are rearranged in the order of magnitude. The search data is then assigned the rearranged values as position information. For example, if the number of search data (leaves or nodes) having a plurality of pieces of the same element type information to be assigned position information is 5, the five values from the front in accordance with the order relationship of FIG. 4A, namely, 1/2, 1/4, 3/4, 1/8, and 3/8 are selected. The values are rearranged in the value magnitude, namely, to 1/8, 1/4, 3/8, 1/2, and 3/4. The search data is thus assigned the rearranged values as corresponding position information.

When the rational values are individually encoded, a rational number with lower resolution (with a smaller denominator value) is generally encoded with a shorter code. The assignment of the value of the rational number position information following the order relationship of FIG. 4A provides, in addition to the advantage that the plurality of pieces of position information are difference encoded together in accordance with the embodiment of the present invention, another advantage that the entire code length of the code related to the position information is minimized when the rational number position information attached to the search data (leaves or nodes) are individually encoded.

The assignment of the position information in accordance with the order relationship of FIG. 4A is similarly performed in the following process.

From the M pieces of position information for assignment, the minimum resolution (the minimum denominator value) N required to represent that number is determined. In the example of FIG. 4A, N is power of 2, and the number of pieces of position information represented by the resolution N is N−1 including 1/N through (N−1)/N. The minimum power of 2 satisfying M<=N−1 becomes N. If M=N−1, M pieces of position information is assigned values of 1/N through (N−1)/N, and the assignment process ends.

If the condition of M=N−1 does not hold, resolution N' lower than the resolution N by one is determined, and a difference value M'=M−(N'−1) is calculated. Here, N'−1 is the number of pieces of position information represented by the resolution N'. The difference value M' is the number of pieces of position information, not represented by the resolution N', out of M pieces of position information for assignment. In other words, the difference value M' is the number of pieces of position information having a denominator of N. Therefore, M pieces of position information is the sum of (N'−1) represented by the resolution N', namely, n/N' (here n=1, 2, . . . , N'−1), and smaller M' pieces of position information having the denominator N, namely, n/N (here n=1, 3, . . . , 2M'−1). Since N is power of 2, the numerator of the position information having the denominator of N is a value that cannot be reduced, namely, an odd number.

As shown in FIG. 4B, the magnitude relationship of these values is as follows in the order from small to large: 1/N , 1/N' (namely, 2/N), 3/N, 2/N' (namely, 4/N), . . . , (M'−1)/N' (namely, (2M'−2)/N), (2M'−1)/N, M'/N'(namely, 2M'/N), (M'+1)/N', (M'+2)/N', . . . , (N'−1)/N'. In other words, these values include the 2M' values starting with 1/N and increasing in steps of 1/N and reaching M'/N'(namely, 2M'/N), and M−2M' values increasing from M'/N' in steps of 1/N' and reaching (N'−1)/N'. The width of increase of 1/N and 1/N' are referred to as a "step width". The 2M' values are determined by successively adding the step width of 1/N to 1/N as the initial value, and the remaining M values are determined by successively adding the step width of 1/N' to the resulting value. M pieces of position information from the front in accordance with the order relationship of FIG. 4 are thus determined. For example, if the number of search data (leaves or nodes) having a plurality of the pieces of the same element type information to be assigned the position information is 5, the resolution N=8, the resolution N'=4, and the difference M'=2 are obtained. With the initial value as 1/8, 2M'=4 values 1/8, 1/4, 3/8, and 1/2 are determined, and a fifth value 3/4 is determined by adding 1/4 to 1/2.

According to this method, the two step widths of 1/N and 1/N' and a predetermined position 2M' for switching between the two step widths are provided so that the M pieces of position information from the front in accordance with the order relationship of FIG. 4 are provided in the order of magnitude. This method eliminates the need for an operation to rearrange the obtained values of position information in the order of magnitude, and the values following the order relationship of FIG. 4A are assigned to in a high speed. By setting a value greater than a difference value thus obtained to the value M' specifying the step width switching position, the value of position information for assignment is shifted to a smaller value. In this case, 2M' does not exceed M.

A position information decoding device of the first embodiment of the present invention is described below with reference to FIG. 11.

Figure 11:
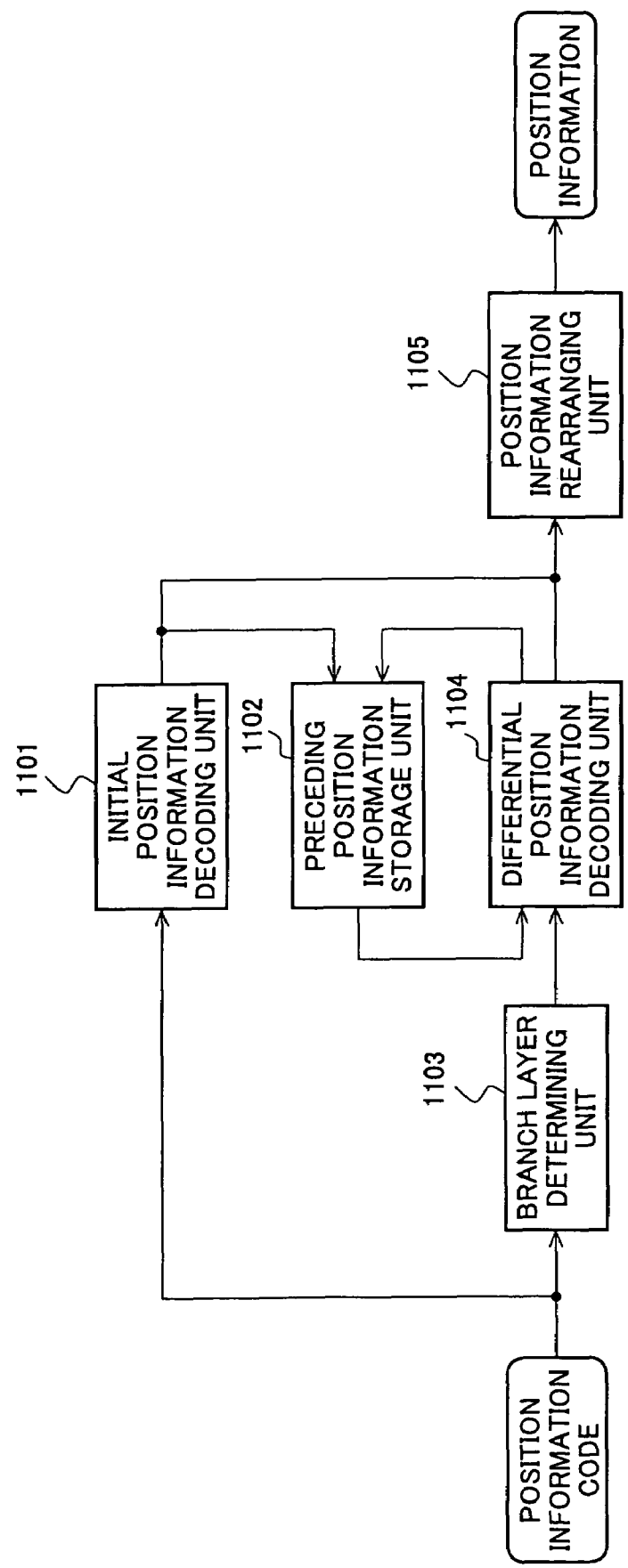
FIG. 11 is a functional block diagram illustrating the schematic structure of a position information decoding device in accordance with the first embodiment of the present invention.

FIG. 11 is a functional block diagram illustrating the schematic structure of the position information decoding device in accordance with the first embodiment of the present invention.

The position information decoding device of the first embodiment of the present invention comprises an initial position information decoding unit 1101, a preceding position information storage unit 1102, a branch layer determining unit 1103, a differential position information decoding unit 1104, and a position information rearranging unit 1105. As previously discussed, in accordance with MPEG-7, the element type information and the position information are individually encoded, and are then handled together with the search data. The present invention relates to a decoding process of the position information. The decoding process of the present invention is not limited to the process of MPEG-7. The present invention is embodied as a decoding device that performs a decoding process including position information decoding to be discussed here.

The most unique functional structure of the position information decoding device of the present embodiment of FIG.

11 lies in the position information rearranging unit 1105 arranged subsequent to a decoding stage.

The position information rearranging unit 1105 rearranges the rational number position information, decoded by the differential position information decoding unit 1104 as a preceding stage and arranged in the order relationship of FIG. 4A, in the order of magnitude of the original values. As previously discussed in this specification, in the case of the position information corresponding to each search data (or nodes) contained in the search information, the search data (or nodes) is typically handled in the same order as that in the original tree structure. Since the position information is easier to handle in that order, the corresponding position information needs to be rearranged in the original order.

The decoding process to be performed prior to the position information rearrangement process of the position information rearranging unit 1105 is identical to the decoding process of the position information represented in the known integer representation. The operation of the position information rearranging unit 1105 will be described later in detail below.

First, the initial position information decoding unit 1101 decodes initial position information, and outputs the decoded initial position information. The decoding process to be performed herein is intended to decode position information that has been encoded in an ordinary method. As the discussion of the encoding process, the discussion of the decoding process is also skipped.

The operation of the position information decoding device of the present embodiment in response to the inputting of the position information code string of FIG. 5 is described below. The position information code string of FIG. 5 is obtained by the above-referenced position information encoding device of FIG. 1 that encodes the position information of each search data 201-209 contained in the search information of FIG. 2. The position information code string to be decoded by the decoding device of the present embodiment is not limited to the code string generated by the encoding device of FIG. 1.

The initial position information (1/2,1/2) decoded by the initial position information decoding unit 1101 is input to the position information rearranging unit 1105 while being recorded onto the preceding position information storage unit 1102. The preceding position information storage unit 1102 currently stores the position information processed at a preceding cycle with respect to the position information currently being decoded.

The branch layer determining unit 1103 successively reads the position information codes of the input position information code string one by one, determines a branch layer of the position information code, in other words, determines what layer the value of the position information is updated at, and transfers the determination results to the differential position information decoding unit 1104. The bit length of position information code to be read successively by the branch layer determining unit 1103 is determined by the number of layers of the position information. As previously discussed in connection with the encoding device, when the position information contained in the identification information of search data is decoded, the element type information is generally encoded together with the encoded position information, namely, the position information code string, before storage or transfer. The element type information is thus decoded and analyzed to determine the number of branchable elements. The number of layers of the position information is thus learned, and the bit length of the position information code to be read is learned. If information indicative of the bit length is separately provided together with the position information code string, the bit length of the position information code to be read based on that information is learned. The determination process of the bit length, which is performed separately from the decoding process of the decoding device of FIG. 11, is not shown.

The differential position information decoding unit 1104 reads the position information stored in the preceding position information storage unit 1102, and updates the value of the position information based on the determination results from the branch layer determining unit 1103 in accordance with the order relationship of FIG. 4A. More specifically, the differential position information decoding unit 1104 increases the value of the position information, stored in the preceding position information storage unit 1102, at the branch layer by one notch in accordance with the order relationship of FIG. 4A based on the determination results of the branch layer determining unit 1103. At all layers under the branch layer, the value of the position information is set to the initial value 1/2 in the order relationship of FIG. 4A. The values of the position information above the branch layer remain unchanged.

The position information (1/2,1/2) is decoded by the initial position information decoding unit 1101, and then stored in the preceding position information storage unit 1102. A position information code to be read next is "10". The branch layer determining unit 1103 determines that the code "10" means that the branching takes place at the second layer, namely, the shot layer. Based on the determination results, the differential position information decoding unit 1104 updates the value of the position information at the second layer=shot layer by one notch in accordance with the order relationship of FIG. 4A. Since 1/2 is followed by 1/4 as shown in FIG. 4A, position information (1/2,1/4) is obtained from position information (1/2,1/2) with the value of the position information at the second layer updated.

With position information (1/2,3/4) recorded in the preceding position information storage unit 1102, position information code "01" is read next. The branch layer determining unit 1103 determines that the code "01" indicates that the branching takes place at the first layer, namely, the scene layer. Based on the determination results, the differential position information decoding unit 1104 updates the value of the position information at the first layer=scene layer by one notch in accordance with the order relationship of FIG. 4A. The value of the position information at layer under the scene layer, namely, at the second layer=shot layer, is set to the initial value 1/2 in the order relationship of FIG. 4A. Since 1/2 is followed by 1/4 as shown in FIG. 4A, position information (1/4,1/2) is obtained from (1/2,3/4) with the values of the position information at the first and second layers updated.

The position information obtained by the differential position information decoding unit 1104 is output to the position information rearranging unit 1105 while being transferred to and recorded in the preceding position information storage unit 1102 for use in the decoding operation of next position information.

When an end code "11" is read by the branch layer determining unit 1103, the decoding process of the position information ends and the position information rearranging unit 1105 continues to rearrange position information.

Since the rational number position information decoded and output by the differential position information decoding unit 1104 is arranged in accordance with the order relationship of FIG. 4A, the position information rearranging unit 1105 rearranges the position information in the original order of magnitude. In the example of decoding the position information code string of FIG. 5, position information 303 of FIG. 3 subsequent to the rearrangement is converted to position information 302 prior to rearrangement. In the rearrangement process, the values of the position information are rearranged in the order of magnitude from an upper layer to a lower layer. If the values of the position information at a first layer are the same, the values of the position information at a second layer under the first layer are rearranged in the order of magnitude. If the values of the position information at the second layer are the same, the values of the position information under the second layer are rearranged in the order of magnitude. Such an operation is recursively repeated. The operation is identical to that of the encoding device that rearranges the position information in accordance with the order relationship of FIG. 4A. Alternatively, the rearrangement of the position information can be performed by handling the values of the position information at all layers in the leaves or nodes together rather than comparing the values of the position information on a per layer basis. For example, the magnitude relationship between the position information at one leaf or node and the position information at another leaf or node is defined. In accordance with the magnitude relationship, an existing sort algorithm such as the quicksort is applied to the position information at the leaf or node to rearrange the position information. Any rearrangement method is perfectly acceptable as long as the rearrangement method executes a rearrangement similar to the above method. The present invention is not limited to the above-referenced rearrangement methods.

As an example of the rearrangement method, the rearrangement process of the position information is described below with reference to FIGS. 12 through 15. The rearrangement process takes advantage of the fact that the values of the rational number position information output from the differential position information decoding unit 1104 and the output order of the values follow the order relationship of FIG. 4A.

Figure 12:
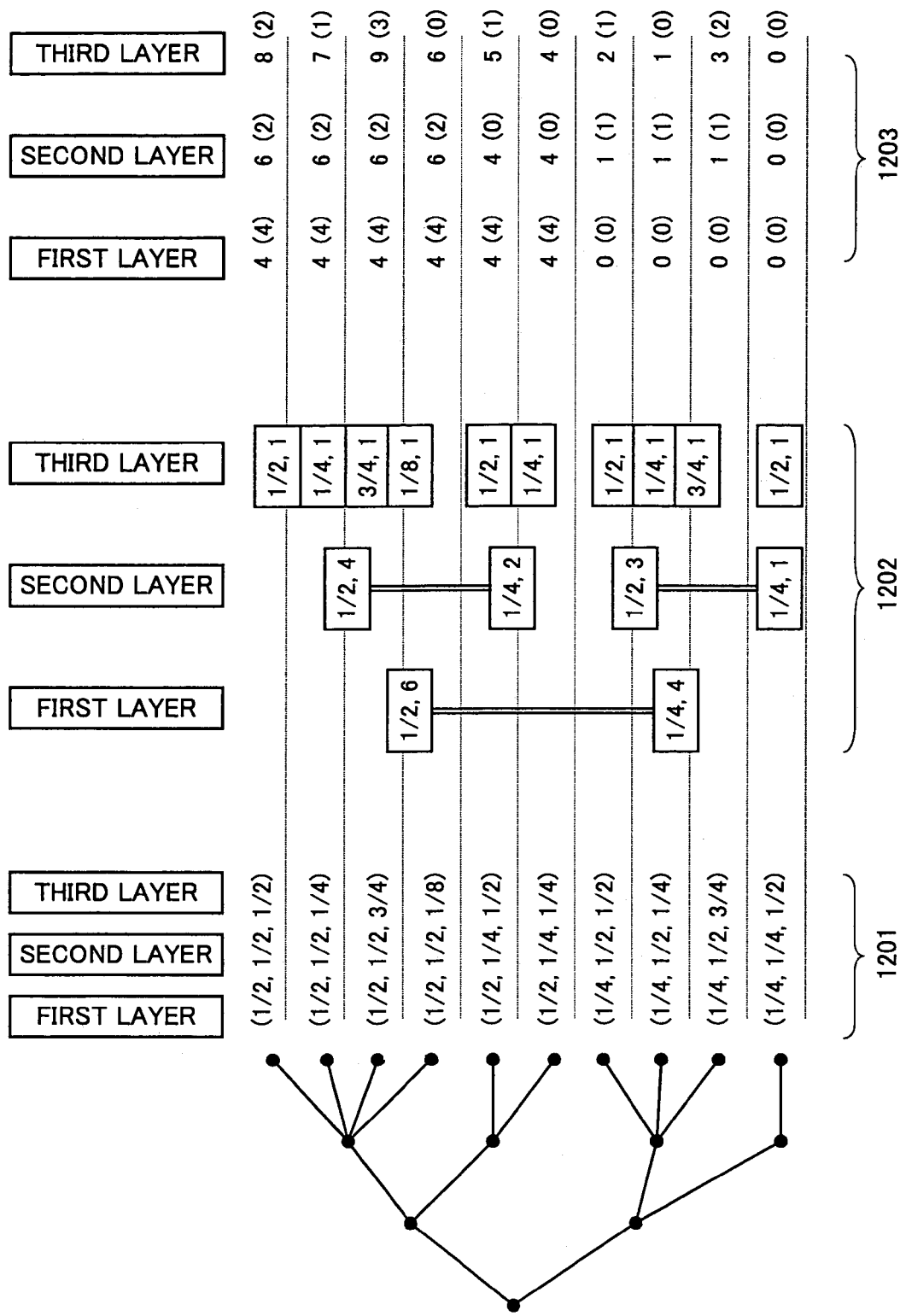
FIG. 12 illustrates an operation example of the position information decoding device that rearranges the position information during decoding in accordance with the first embodiment of the present invention.

FIG. 12 illustrates an operation example of the rearrangement of the position information during decoding in accordance with the first embodiment of the present invention. The rearrangement process is performed inside the position information rearranging unit 1105.

As shown in FIG. 12, 10 pieces of position information 1201 (the number of branchable layers is 3) are decoded and output by the differential position information decoding unit 1104. The position information 1201 is arranged in the order of decode from the top, namely, in accordance with the order relationship of FIG. 4A.

In the rearrangement process of FIG. 12, the decoded position information is successively assigned serial numbers representing the order of magnitude (starting with 0). This number is referred to as an "index" (see 1203 of FIG. 12). If each of the position information is assigned the respective index, and the position information is rearranged in accordance with the value of the indices. Therefore, the position information rearranging unit 1105 includes an index calculator (calculating unit), such as the one shown in FIG. 13. Since the number of the position information 1201 to be rearranged in FIG. 12 is 10, the values of the indices 1203 are 0 through 9. Depending on the number of pieces of position information, for example, the index 1203 takes 0 to 14 for 15 pieces of position information, and the index 1203 takes 0 to 29 for 30 pieces of position information. The value of index assigned to each of position information is determined as described below.

Figure 13:
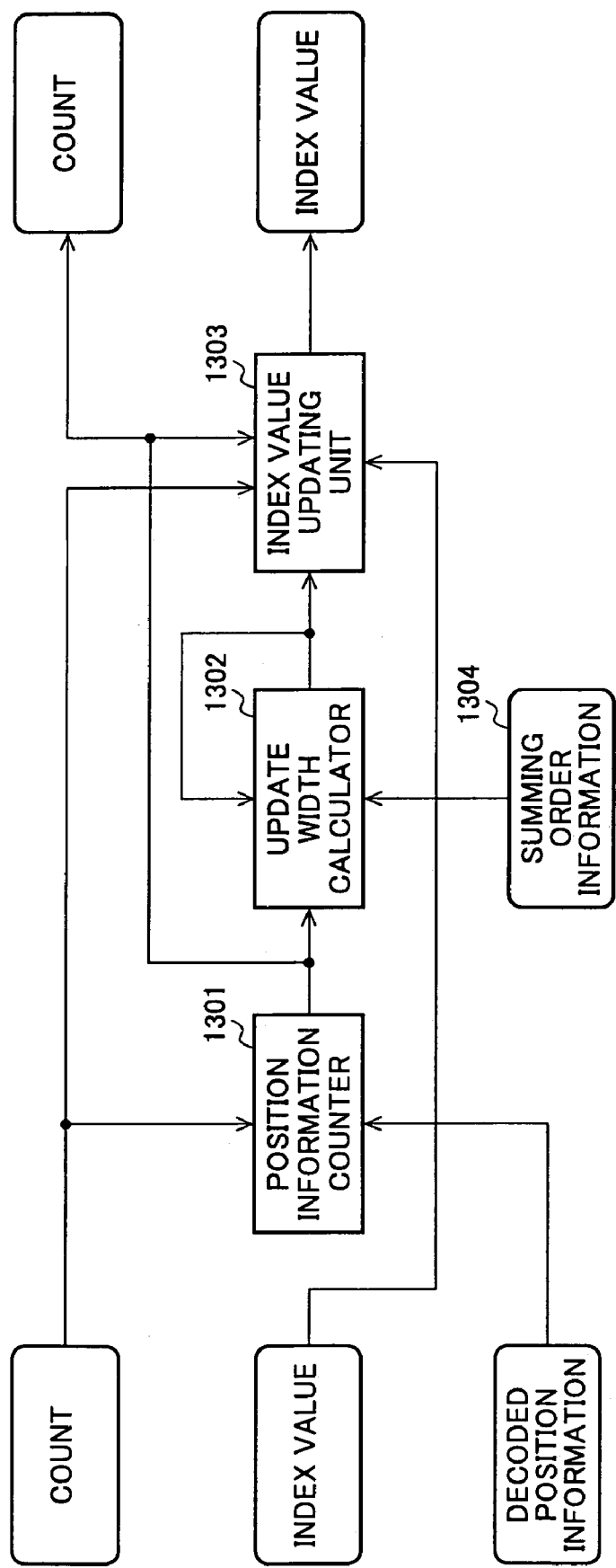
FIG. 13 is a functional block diagram of the position information decoding device that rearranges the position information during decoding in accordance with the first embodiment of the present invention.

FIG. 13 is a functional block diagram of the position information decoding device that performs a process at one branch position in a given layer to calculate the value of an index assigned to each of the position information. In other words, FIG. 13 illustrates the internal structure of the index calculator in the position information rearranging unit 1105. The process of FIG. 13 is performed by a position information counter (counting unit) 1301, an update width calculator 1302, and an index value updating unit 1303. The index calculator receives the decoded position information, the count processed at an immediately upper layer, and as index values, a new count, and an updated index value. The update width calculator 1302 receives separately summing order information 1304. By performing that process on all branch positions of all layers, indices corresponding to each position information are obtained.

The position information counter 1301 receives the decoded position information and the count at the immediately upper layer, and counts the number of pieces of position information having the same value of position information at a given layer at a given branch position. FIG. 12 illustrates count results 1202. The count results 1202 include those of all layers and all branch positions.

For example, at (the branch position of) the first layer, six out of the ten pieces of position information take the value 1/2, and four out of the ten pieces of position information take the value 1/4. At first branch positions at the second layer (six pieces of position information from the top having the value 1/2 at the first layer), four out of the six pieces of position information take the value 1/2, and two out of the six pieces of position information take the value 1/4 at the second layer. The "branch position" refers to a set of position information corresponding to all elements (leaves or nodes) hanging under a node at an immediately upper layer as a starting point above a target layer in a tree structure, or refers to a set of position information having the same value at layers above the target layer based on the value of position information. The number of pieces of position information contained in each branch position is provided by the count at the input immediately upper layer. At the first layer of FIG. 12, elements hanging under the root, namely, the position information of all elements, are referred to "branch position" at the first layer.

The order of occurrence of the values of the position information to be counted is the order of decoding. Therefore, the position information follows the order relationship of FIG. 4A at any branch position. The count process always determines the count in accordance with the order relationship of FIG. 4A. If any value is missing (a lack of value occurs in the middle), the count of occurrence of the value is counted as 0. In other words, in the resulting count, a first count is always the initial value 1/2 in FIG. 4A, and a second count is the count of occurrence of 1/4 in FIG. 4A. The count results are output to the update width calculator 1302 and the index value updating unit 1303 for use in a process of a next layer.

Based on the received count from the position information counter 1301, the update width calculator 1302 determines an update width of the index value of each position information in accordance with the position information at the target layer.

The update width of the index value of the position information having a certain value at the target layer at a given branch position is determined depending on how many pieces of position information having a value smaller than the certain value are there at the layer. For example, if M1 pieces of position information, M2 pieces of position information, and M3 pieces of position information have respectively the values 1/4, 1/2, and 3/4 at a target layer at a certain branch position, M1 pieces of position information having the value 1/4 are present prior to the position information having the value 1/2. Therefore, the position information having the value 1/2 need to be provided with the index which is larger by M1 than that of the position information having the value 1/4. Accordingly, the update width of the index values of the position information having the value 1/2 is M1. For the same reason, the update width of the position information having the value 3/4 is M1+M2. The M1 pieces, M2 pieces, and M3 pieces of position information correspond to the counts obtained by the position information counter 1301. More specifically, by summing the counts provided by the position information counter 1301 in the order of magnitude, the update width corresponding to each value of the position information is thus obtained.

To perform the above summing process, the counts provided by the position information counter 1301 need to be read in the order of magnitude. On the other hand, as previously discussed, the counts provided by the position information counter 1301 indicate the counts of occurrence of each of position information in accordance with the order relationship of FIG. 4A. Without comparing the values of the position information one piece with another, the magnitude relationship of the values are thus learned from the order of acquisition of the counts. Without direct comparison of the values, the amount of computation is reduced. The summing order information 1304 serves this purpose.

The summing order information 1304 is described below with reference to FIGS. 14 and 15. Each of a table 1401 of FIG. 14 and a table 1501 of FIG. 15 is an example of the summing order information 1304. For example, if the number of the values of the position information counted is 3 as a result of counting to 3/4 in the order relationship of FIG. 4A, the order of magnitude from small to large is a second value (1/4), a first value (1/2), and a third value (3/4), as represented by the table 1401 in FIG. 14, and the counts are summed in that order. If the counts of the position information is 7 as a result of counting to 7/8, the order of magnitude is listed in the table 1501 in FIG. 15, and the counts are summed in that order. In other words, depending on what position information in the order relationship of FIG. 4A is counted (decoded) to, the order of magnitude of the counting order (decoding order) is uniquely determined. Information of the order of magnitude of the counts is referred to as "summing order information".

If the counts of the values of the position information is 2 as a result of counting to 1/4 in the order relationship of FIG. 4A, the summing order information for the values of two pieces of position information may be prepared and used. It is also possible to prepare the summing order information of each value of the position information to that value in the order relationship of FIG. 4A. However, since a large capacity of memory is required to prepare the summing order information of all values of the position information, such an arrangement is not always appropriate. With N being power of 2, only a plurality of pieces of summing order information of the values of position information up to (N−1)/N in the order relationship of FIG. 4A are prepared. The summing order information of the values of the position information other than up to (N−1)/N can determine the summing order by referencing any of the prepared plurality of pieces of summing order information up to (N−1)/N.

The summing order information corresponding to (N−1)/N equal to or larger than the value of the position information decoded last in the order relationship of FIG. 4A can be used to determine the summing order. To limit the summing operation to a minimum, a minimum (N−1)/N equal to or larger than that value is selected and the summing order information corresponding to the minimum (N−1)/N is used. Then, N is equal to the denominator of the value decoded last. For example, if the value of the position information decoded at a given branch position are two pieces of 1/2 and 1/4, the denominator of the value 1/4 decoded last is 4, and decoding order information to 3/4, namely, the table 1401 of FIG. 14 is used. If the value of the position information is four pieces of 1/2, 1/4, 3/4, and 1/8, the denominator of the value 1/8 is 8, and decoding order information to 7/8, namely, the table 1501 of FIG. 15 is used. The counts provided by the position information counter 1301 are summed in the order of the summing order information 1304, and the update width of the index value corresponding to each of the values of the position information is thus determined. The count for empty decoded value is treated as 0 in the summing operation. The update width is then output to the index value updating unit 1303.

The index value updating unit 1303 updates the value of the index assigned to each position information based on the update width provided by the update width calculator 1302, the count results provided by the position information counter 1301, and the count at the immediately upper layer.

The count obtained first in the position information counter 1301 means the number of pieces of position information having the value 1/2 at a target layer. As for the position information of the first count from the front from among the position information at the branch position, the value of index is updated with the update width corresponding to the value 1/2 obtained by the update width calculator 1302. The front of the branch position is determined from the input count at an immediately upper layer. Similarly, the second and subsequent counts are also processed.

The process of the update width calculator 1302 and the index value updating unit 1303 is described below. The update width calculator 1302 and the index value updating unit 1303 process the position information at the branch position at the first and second layers based on the count result 1202, indices, and the update width 1203 of FIG. 12.

First, the initial value of the index of each of position information is set to 0.

The position information decoded at the first layer includes two values of 1/2 and 1/4, and the table 1401 of FIG. 14 is used as the summing order information 1304. The first position information value 1/4 is set to an update width of 0 of an index value in the summing order information of the table 1401 of FIG. 14. The update width calculator 1302 adds a count 4 corresponding to the value 1/4 to the update width 0, thereby determining an update width of the index value corresponding to the next value 1/2 of the table 1401. In the count result 1202 and the index (and update width) 1203 of FIG. 12, no next value 3/4 is present in the first layer. If a next value 3/4 is available, the update width calculator 1302 adds a count 6 corresponding to the value 1/2 to the update width 4, thereby determining an update width 10 corresponding to the next value 3/4 in accordance with the table 1401.

Based on the first count 6, the index value updating unit 1303 adds the update width 4 corresponding to the value 1/2 to the index value 0 (initial value) assigned to six pieces of position information from the front, thereby determining the updated index value 4. The index value updating unit 1303 adds an update width 0 corresponding to the value 1/4 to the index value 0 of following 4 pieces of position information corresponding to the second count, thereby determining the updated index value 0.

Similarly, the values of position information decoded at a first branch position (six pieces of position information from the top) at the second layer include two pieces of 1/2 and 1/4, and the table 1401 of FIG. 14 is used as the summing order information 1304. The first position information value 1/4 in the summing order information of the table 1401 is set to 0 update width of the index value. The update width calculator 1302 adds the count 2 corresponding to the value 1/4 to the update width 0, thereby determining an update width 2 of the index value corresponding to a next value 1/2 in the table 1401.

Based on the first count 4, the index value updating unit 1303 adds an update width of 2 corresponding to a value 1/2 to the index value of 4 assigned to 4 pieces of position information from the front, thereby determining an updated index value 6. The index value updating unit 1303 adds an update width of 0 corresponding to a value 1/4 to the index value of 4 of 2 pieces of following position information corresponding to the second count, thereby determining an updated index value of 4.

In the second branch position at the second layer (lower 4 pieces of position information), the table 1401 of FIG. 14 is used as the summing order information 1304. The update width calculator 1302 determines an update width of 0 corresponding to the position information value of 1/4, and an update width of 1 corresponding to the value 1/2.

In accordance with the count provided by the position information counter 1301, the index value updating unit 1303 adds an update width of 1 to 3 pieces of position information from the front of the branch position, thereby determining an index value of 1, and adds an update width value of 0 to the remaining position information, thereby updating the index value to 0. The front of the second branch position at the second layer is determined by the count at the input immediately upper layer.

The two counts, 6 and 4, at the first layer as the count results 1202 represent the number of pieces of position information at the two branch positions at the second layer. For this reason, the front of the second branch position at the second layer is calculated by adding 1 to the number of pieces of position information at the first branch position, namely, 6. The front of the second branch position is thus 7. The front of the branch position is thus identified, and the index of each of position information contained in the branch position is updated. Instead of the count, front position converted information of each branch position is stored and received from an upper layer.

This process is similarly performed at each branch position of each layer. When the process is successively performed from an upper layer, index values at each layer subsequent to updating and the values of updated widths (in parentheses) determined at each branch position are shown at 1203 of FIG. 12. Since each of the values of the position information occurs one time at the third layer as the lowest layer, the index values having an interval of 1 from one to another are finally obtained. The indices thus obtained represent an order relationship of the position information. By reading the position information in accordance with the index, the position information is rearranged. The rearranged position information is output from the position information rearranging unit 1105 of FIG. 11.

The index value is successively updated by adding the value of the update width in each of the above process. Alternatively, the value of update width at each layer is separately determined, and the values of update widths of each of the layers are then summed.

In the above process described with reference to FIG. 13, the count process of the position information, the summing process, and the update process of the index values are performed at each branch position. Alternatively, the count process of the position information may be performed on all branch positions at all layers first, and the determined counts may be stored as the count results 1202 of FIG. 12 for use in later process. In this case, a memory for storing the count results is additionally required. Since the count results of another layer can be used at any time, this arrangement eliminates the need for performing the process in the order of layers, and the order of processing the layers and the order of the branch positions can be flexibly modified. Further, the count process can be performed while the position information is decoded, rather than after all position information is decoded.

In the above-referenced rearrangement process of the position information (the calculation method of the index values), by using the summing order information 1304 reflecting that the value of the position information to be decoded follows the order relationship of FIG. 4A, the rearrangement process is performed without comparing the decoded values, and the calculation process is thus lightened. In accordance with the above method, the process of the update width calculator 1302 is the summing process of the number of occurrences of output position information. If any missing or deficient value of position information occurs, the number of occurrences of the position information is counted as 0, and the same process is applicable to all position information. For this reason, this arrangement requires no particular branch process. Even if a deficiency of position information takes place as described below, the rearrangement process is performed at a high speed.

The rearrangement method in the decoding process has been discussed. The above-referenced rearrangement method is equally applicable to the encoding process. In such a case, the summing order information 1304 is not converted from the "order of FIG. 4A" to the "order of magnitude" as shown in FIGS. 14 and 15, but converted from the "order of magnitude" to the "order of FIG. 4A" corresponding to the encoding process. The position information is represented in rational numbers of "a natural number over power of 2 (the denominator being the power of 2 and the numerator being the natural number)" in the present embodiment. The rearrangement process is also applicable to position information represented in another rational number, and any position information, if not in rational number representation, in need of rearrangement.

The decoding operation of the position information code string of FIG. 9 is described below as an example of decoding of the position information having a tree structure with a deficiency.

When position information (1/2,1/2) is stored in the preceding position information storage unit 1102, a position information code to be read by the branch layer determining unit 1103 is a deficiency code "00" representing a deficiency. In this case, the branch layer determining unit 1103 notifies the differential position information decoding unit 1104 that the position information coming next is at a deficient position, and then read a next position information code "10". The next position information is a code representing a branch of the second layer, and the branch layer determining unit 1103 notifies the differential position information decoding unit 1104 of the determination results thereof.

The differential position information decoding unit 1104 learns that the next update position is at the deficient position, and that the branch layer to be updated is the second layer. From the position information (1/2,1/2) stored in the preceding position information storage unit 1102, the differential position information decoding unit 1104 updates the value of the second layer by one notch in accordance with the order relationship of FIG. 4A, namely, from 1/2 to 1/4 thereby resulting in updated position information (1/2,1/4). Since the differential position information decoding unit 1104 is notified that the position information is at the deficient position, the differential position information decoding unit 1104 does not output the updated position information to the position information rearranging unit 1105. The differential position information decoding unit 1104 outputs the updated position information (1/2,1/4) to only the preceding position information storage unit 1102 for storage.

Since the position information code to be read next is "10", the branch layer determining unit 1103 determines that the next branch layer is the second layer, and notifies the differential position information decoding unit 1104 of the determination results thereof.

The differential position information decoding unit 1104 learns that the branch layer is the second layer. The differential position information decoding unit 1104 updates the value of the second layer of the position information (1/2,1/4) stored in the preceding position information storage unit 1102 from 1/4 to 3/4 in accordance with the order relationship of FIG. 4A, thereby resulting in (1/2,3/4). Since this position information is not at a deficient position, the position information (1/2,3/4) is output to the position information rearranging unit 1105. The next position information is thus correctly decoded.

A deficiency code "00" representing a deficiency is the position information code that is read by the branch layer determining unit 1103 at the moment the position information (1/4,3/4) is recorded onto the preceding position information storage unit 1102. The branch layer determining unit 1103 notifies the differential position information decoding unit 1104 that position information coming next is at a deficient position, and reads the next position information code "01". Since the next position information is a code representing a branch at the first layer, the branch layer determining unit 1103 notifies the differential position information decoding unit 1104 of the determination results thereof.

The differential position information decoding unit 1104 learns that the next update position is at a deficient position, and that the branch layer to be updated is the first layer. From the position information (1/4,3/4) stored in the preceding position information storage unit 1102, the differential position information decoding unit 1104 updates the value at the first layer by one notch in accordance with the order relationship of FIG. 4A, namely, from 1/4 to 3/4, and sets the value at the second layer to the initial value 1/2 in accordance with the order relationship of FIG. 4A. The updated position information (3/4,1/2) thus results. Since the differential position information decoding unit 1104 is notified that the position information (3/4,1/2) is at the deficient position, the differential position information decoding unit 1104 outputs the value (3/4,1/2) not to the position information rearranging unit 1105 but to only the preceding position information storage unit 1102 for storage.

Since the position information code to be read next is "10", the branch layer determining unit 1103 determines that the next branch layer is the second layer, and notifies the differential position information decoding unit 1104 of the determination results thereof.

Upon learning that the branch layer is the second layer, the differential position information decoding unit 1104 updates the value of the second layer of the position information (3/4,1/2) stored in the preceding position information storage unit 1102, from 1/2 to 1/4, in accordance with the order relationship of FIG. 4A, thereby resulting in (3/4,1/4). The position information (3/4,1/4), which is not at a deficient position, is output to the position information rearranging unit 1105. The next position information is thus correctly decoded.

When the position information of the search data (or nodes) contained in the search information is handled, decoded position information corresponds to search data (or nodes). The search data (or nodes) are often handled in the order of occurrences in the original tree structure, namely, in the order of magnitude for transmission or storage. In accordance with the present invention, the rearrangement process results in the position information in the original order of magnitude, thereby assuring correspondence with the search data (or nodes). Each of the search data (or nodes) is thus identified.

If the search data (or nodes) can be selected between at the order of occurrence in the original tree structure and at the same order of FIG. 4A as the position information, a flag indicating whether the search data (or nodes) are rearranged or not is separately arranged, and is transmitted or stored together with the position information code string. In accordance with the value of the flag, the position information rearranging unit 1105 can select whether to rearrange the position information.

Figure 16:
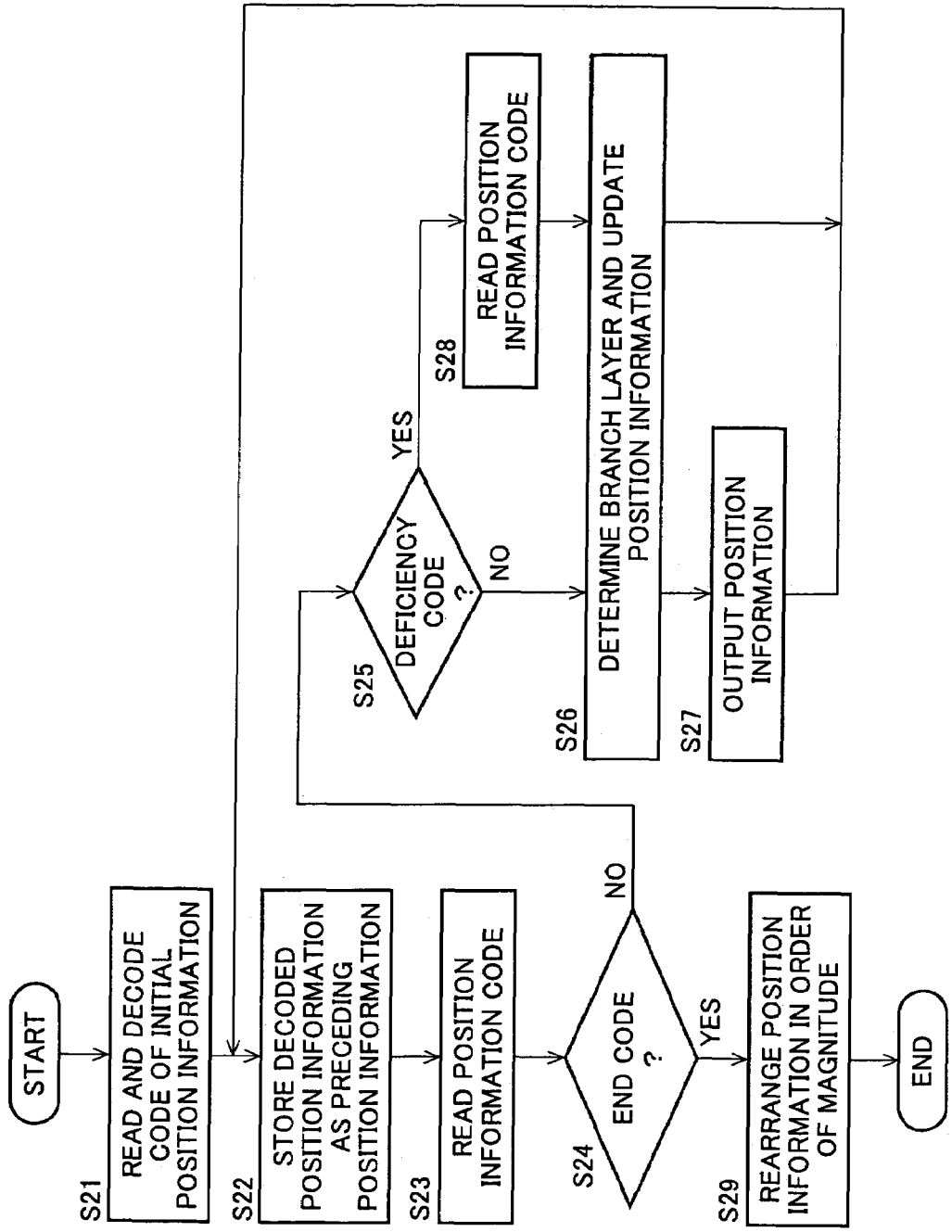
FIG. 16 is a flowchart illustrating a decoding method of the position information in accordance with the first embodiment of the present invention.

FIG. 16 is a flowchart illustrating the decoding method of the position information in accordance with the first embodiment of the present invention.

The position information decoding method of the first embodiment of the present invention comprises an initial position information decoding step (step S21), a preceding position information storage step (step S22), a branch layer determination/differential position information decoding step (step S26), and a position information rearranging step (step S29). The decoding method of the first embodiment of the present invention also relates to the decoding of the position information. The process of the present invention includes the decoding method of decoding the position information discussed herein.

First, initial position information is decoded using ordinary method (step S21). The decoded initial position information is stored as preceding position information (step S22).

A position information code is read (step S23). It is then determined whether the read position information code is an end code (step S24). If it is determined that the read position information is not an end code, it is then determined whether the read position information is a deficiency code (step S25).

If it is determined that the read position information is not a deficiency code, a branch layer is then determined based on the position information code. The position information is updated based on the determination results, namely, next position information is determined (step S26). As previously discussed in connection with the decoding device, the process of determining the next position information is designed to increase the value of the position information at the branch layer by one notch in accordance with the order relationship of FIG. 4A. At a layer below the branch layer, the value of the position information is set to the initial value 1/2 in the order relationship of FIG. 4A, and at a layer above the branch layer, the value of the position information remains unchanged. The resulting position information is output (step S27) while being stored as the preceding position information (step S22) This process is repeated.

If it is determined that the read position information is a deficiency code, the next position information code is read (step S28). The branch layer is determined from the read position information code, and next position information is determined the same as above (step S26). Since the position information determined herein is at a deficient position, the position information is not output but stored as mere next preceding position information (step S22). The process subsequent to step S22 is then repeated.

If it is determined that the read position information code is an end code (step S24), position information decoded last and output is rearranged in the order of magnitude (step S29), and the decoding process ends.

In the encoding/decoding device and the methods thereof of the embodiment of the present invention, "a natural number over power of 2" is used as the rational number position information. However, the rational number position information is not limited to this representation. For example, a "natural number over power of 3 (the denominator being power of 3 and the numerator being the natural number)" can be equally used. In accordance with the embodiment of the present invention, the "natural number over power of 2" does not include 0, but 0 also can be used as a candidate value of the position information. In such a case, 0 precedes 1/2 in the order relationship of FIG. 4A, and the initial value is 0. The present invention is also applicable to position information other than that in rational number representation, for example, applicable to position information that is not ordered as is but can be ordered by performing the rearrangement process. If one value to be updated from another value cannot be uniquely identified from the order relationship of values in position information in accordance with the present invention, a predetermined order relationship is determined, and the position information is rearranged in accordance with the determined order relationship. As the position information represented in the integer number, a plurality of pieces of position information is encoded/decoded using the differential encoding technique.

Second Embodiment

A position information encoding device of a second embodiment of the present invention is described below with reference to FIGS. 17 through 21.

Figure 17:
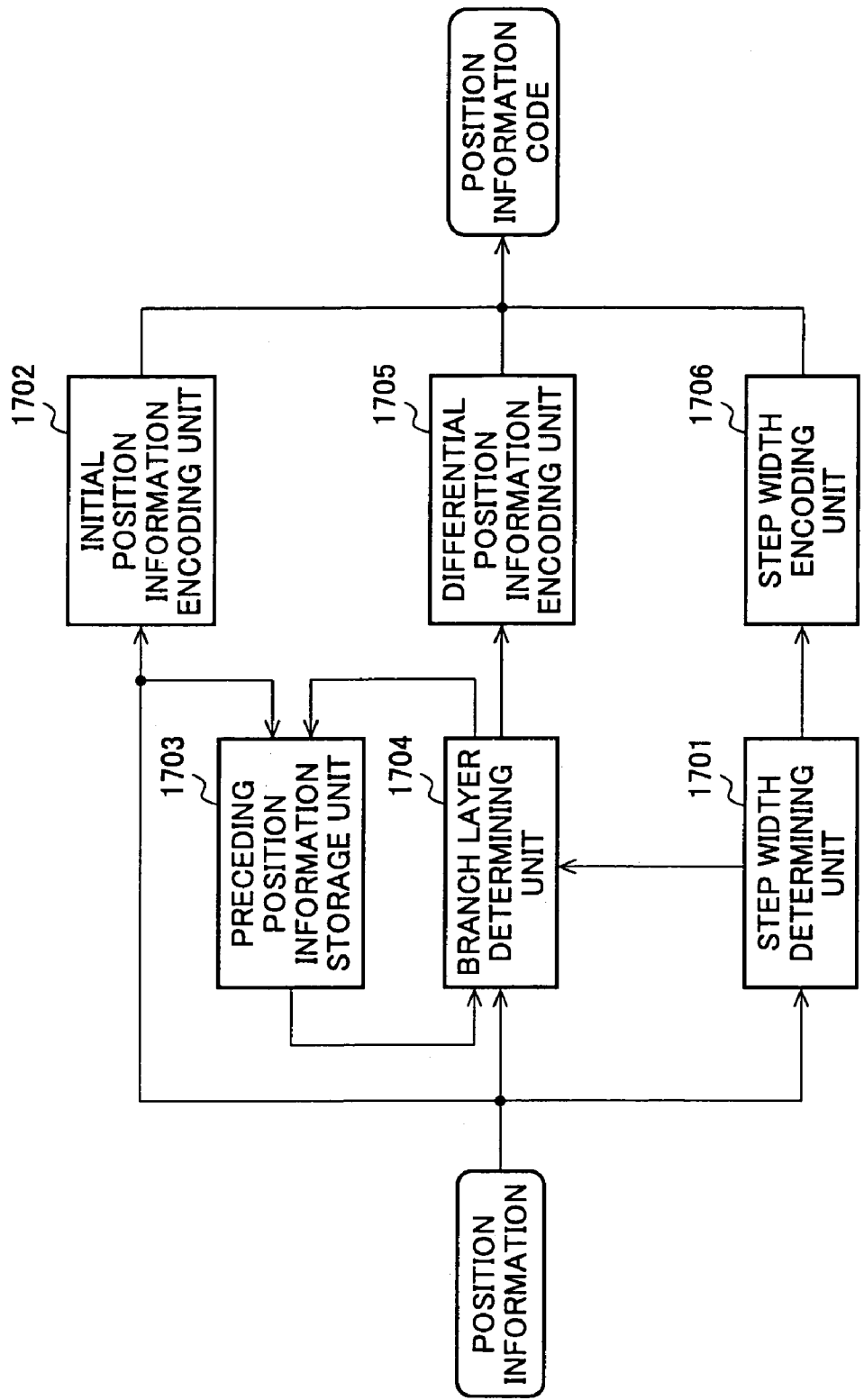
FIG. 17 is a functional block diagram illustrating the schematic structure of a position information encoding device in accordance with a second embodiment of the present invention.

FIG. 17 is a functional block diagram illustrating the schematic structure of a position information encoding device in accordance with the second embodiment of the present invention.

The position information encoding device of the second embodiment of the present invention comprises an initial position information encoding unit 1702, a preceding position information storage unit 1703, a step width determining unit 1701, a step width encoding unit 1706, a branch layer determining unit 1704, and a differential position information encoding unit 1705. From among these elements, the initial position information encoding unit 1702, the preceding position information storage unit 1703, and the differential position information encoding unit 1705 are respectively identical to the initial position information encoding unit 102, the preceding position information storage unit 103, and the differential position information encoding unit 105 in the functional blocks forming the position information encoding device of the first embodiment of the present invention described with reference to FIG. 1.

In the above-described first embodiment, a unique order relationship relating to the value of rational numbers possibly taken by the position information is defined beforehand to encode a plurality of pieces of position information represented in rational numbers of search information having a tree structure as shown in FIG. 2. The plurality of pieces of position information to be encoded are then rearranged in accordance with the order relationship. Through the rearrangement process, a value of a next piece of position information becomes unique with respect to a value of a current piece of position information. Even the position information in the rational number representation is difference encoded as the position information in the integer number representation. To this end, the position information encoding device of the first embodiment of FIG. 1 comprises the position information rearranging unit 101. To convert the rearranged position information back to the original order of magnitude, the position information decoding device of the first embodiment of FIG. 11 comprises the position information rearranging unit 1105.

In contrast, in accordance with the second embodiment, the order relationship of the position information remains unchanged from the order of magnitude, but instead, a step width in the increase of the value of the rational numbers is determined. Differential encoding/decoding is thus performed by encoding/decoding the step width together with the position information code. In this way, the differential encoding/decoding of the rational number position information becomes possible without the need for the rearrangement process of the first embodiment. As will be discussed below in detail, in accordance with the present embodiment, the a fixed step width is determined and imparted to each layer, and when branching takes place at a given layer, the step width serves as an initial value of position information for a layer below the branch layer. The encoding/decoding process is thus simplified, and reduction in the encoding efficiency is thus controlled. To this end, the position information encoding device of the second embodiment of FIG. 17 comprises, instead of the position information rearranging unit 101 of FIG. 1, the step width determining unit 1701 and the step width encoding unit 1706. The position information decoding device of the second embodiment of FIG. 23 to be described below comprises, instead of the position information rearranging unit 1105 of FIG. 11, the step width decoding unit 2305.

The position information encoding device, the encoding method, the decoding device, and the decoding method in accordance with the second embodiment of the present invention are described below. The following description is based on the previous description of the position information encoding device, the encoding method, the decoding device, and the decoding method in accordance with the first embodiment of the present invention, and the description of elements shared by the two embodiments is omitted as necessary. The previous detailed description of the first embodiment including limitations of the first embodiment is not repeated, and unless otherwise noted, the limitation of the first embodiment is applicable to the second embodiment as is.

Figure 18:
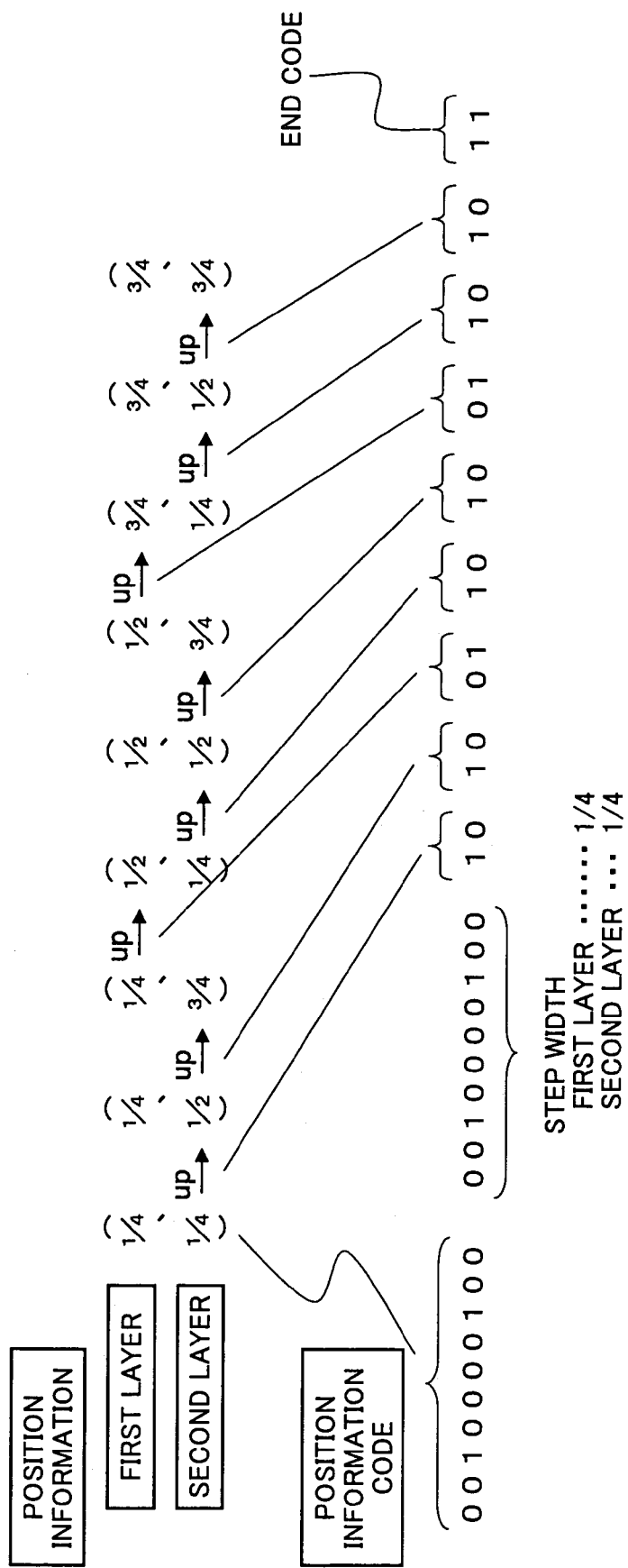
FIG. 18 illustrates an example of position information to be encoded by and a position information code string encoded by one example of the position information encoding device in accordance with the second embodiment of the present invention.

FIG. 18 illustrates an example of position information (position information contained in the identification information corresponding to each data of the search information of FIG. 2) to be encoded by and a position information code string encoded by one structure example of the position information encoding device in accordance with the second embodiment of the present invention. With reference to FIG. 18, the operation of the position information encoding device of the second embodiment of the present invention of FIG. 17 is described below.

Using an ordinary method rather than differential encoding, the initial position information encoding unit 1702 encodes initial position information out of a plurality of pieces of position information to be encoded. As shown in FIG. 18, the initial position information (1/4,1/4) is encoded by 10 bits=5×2 bits with 5 bits per variable. The encoding method of the present invention of encoding the initial position information is omitted as in connection with the first embodiment.

The preceding position information storage unit 1703 records position information processed in a preceding cycle, and outputs the recorded position information when next position information is encoded. First, the encoded initial position information (1/4,1/4) is recorded and stored.

The step width determining unit 1701 determines a fixed "step width" corresponding to an incremental width from one value to another value in connection with the values of position information arranged in the order of magnitude, and outputs the step width to the step width encoding unit 1706 and the branch layer determining unit 1704.

With one step width as being an initial value, the value of the step width is incrementally added. The value of position information representable by the step width is thus determined. The step width at a given layer is set so that all values of position information belonging to that layer are represented. To efficiently encode position information with excess encoding precluded, the step width is preferably large. In accordance with the present embodiment, the step width of "1 over power of 2" (the denominator being power of 2 and the numerator being 1) is used instead of a rational number of a "natural number over power of 2 (the denominator being power of 2 and the numerator being the natural number)". The rational number is not limited to this representation, and the step width is also not limited to this representation.

From among the position information of FIG. 18 to be encoded, the values of the position information present in the first layer are 1/4, 1/2, and 3/4. With the initial value being 1/4 and the step width being 1/4, the value is updated, and the updated values can contain these values. The values of the position information present in the second layer are also 1/4, 1/2, and 3/4, and the step width at the second layer is also set to 1/4. If the values of present position information are 1/4, 1/2, and 5/8, the initial value=step width=1/4, and the value of 5/8 cannot be expressed. In this case, with the initial value=step width=1/8, the values can contain 1/4, 1/2, and 5/8.

As for the above-referenced step width represented by the "1 over power of 2", the values of position information belonging to the same layer are arranged in the order relationship of FIG. 4A and the value at the rearmost position is set to be the resolution=the value of the denominator. The step width is thus determined. The step width is 1 over <the value of the denominator of the value at the rearmost position>. If the values of position information belonging to the same layer are arranged in accordance with the order relationship of FIG. 4A, the resolution of the value at the rearmost position becomes highest. It is thus guaranteed that the other values having resolution lower than (or equal to) the resolution at the rearmost position are represented.

In another technique, which is not used in this embodiment, all values of position information belonging to a given layer are arranged in the order of magnitude, a difference between two adjacent values is calculated, and the greatest common factor of the difference values and the minimum value of position information is determined. In this method, an even more efficient step width is set.

For example, if only 3/16, 3/8, and 3/4 are used as the values of position information, a difference value between 3/16 and 3/8 is 3/16, a difference value between 3/8 and 3/4 is 3/8, and the minimum value of position information 3/16 result in the greatest common factor of 3/16. This value is thus set as the step width of the values of position information and the initial value. The three values 3/16, 3/8, and 3/4 are thus efficiently represented by 3/16.

The step width encoding unit 1706 encodes and outputs the step width corresponding to each layer determined by the step width determining unit 1701. The encoding process is performed on each of the step widths of the layers. As in the previously discussed encoding process of the initial position information, an ordinary method is used. As shown in FIG. 18, each of the step width of 1/4 at the first layer and the step width of 1/4 at the second layer is encoded using 5 bits. In the present invention, the encoding method of the step width of the position information is not described as the encoding method of the initial position information.

In accordance with the present embodiment, the encoding of the step width is performed subsequent to the encoding of the initial position information. Alternatively, the encoding of the step width can be performed prior to the encoding of the initial position information. As will be discussed later, the value of the step width defined herein is also used as an initial value of position information imparted to position information at layer below a branch layer when the values of the position information at the branch layer are difference encoded/decoded.

The process performed by the branch layer determining unit 1704 is basically identical to the encoding process performed to the position information represented in the conventional integer number. The difference is that the step width fixed to "1" is used in the integer number position information while the step width determined by the step width determining unit 1701 is used, and that the initial value in the integer number position information is 0 while the step width, determined by the step width determining unit 1701 and identical to the initial value of the position information, is used as the initial value. As discussed in detail in connection with the position information encoding device of the first embodiment, the value of the step width is used to determine deficiency in the encoding device of FIG. 17.

The branch layer determining unit 1704 compares input position information to be encoded with position information stored in the preceding position information storage unit 1703, determines a branch layer based on the comparison results, and outputs the determination results to the differential position information encoding unit 1705. At this point, based on the value of the step width output from the step width determining unit 1701, the branch layer determining unit 1704 determines deficiency as previously discussed in connection with the first embodiment, and outputs the determination results.

In response to the determination results (branch layer and the presence or absence of deficiency) of the branch layer determining unit 1704, the differential position information encoding unit 1705 selects and outputs a position information code.

When the second position information (1/4,1/2) is encoded as shown in FIG. 18, the preceding position information storage unit 1703 stores the position information (1/4,1/4) encoded in a preceding cycle. If these pieces of position information are compared with each other, the values of the first layer, namely, the scene layer are identical to each other, and the value of the position information at the second layer, namely, the shot layer is increased. Since the value of position information at the second layer is increased from 1/4 to 1/2 by a step width of 1/4 at the second layer, the tree structure branches without deficiency. The determination results are output to the differential position information encoding unit 1705, and the differential position information encoding unit 1705 outputs a position information code "10" corresponding to the second layer. The description of the first embodiment concerning the type of the position information code and the bit length of the position information code is also applicable here.

When fourth position information (1/2,1/4) is encoded as shown in FIG. 18, the preceding position information storage unit 1703 stores position information (1/4,3/4) encoded in a preceding cycle. When the two pieces of position information are compared with each other, the value of position information is increased at the first layer, namely, the scene layer. The value of position information at the first layer is increased from 1/4 to 1/2 by a step width of 1/4 at the first layer, and the value at the second layer becomes an initial value 1/4 equal to the step width of the second layer. This means that the tree structure branches without deficiency. The determination results are output to the differential position information encoding unit 1705, and the differential position information encoding unit 1705 outputs a position information code "01" corresponding to the first layer.

Figure 19:
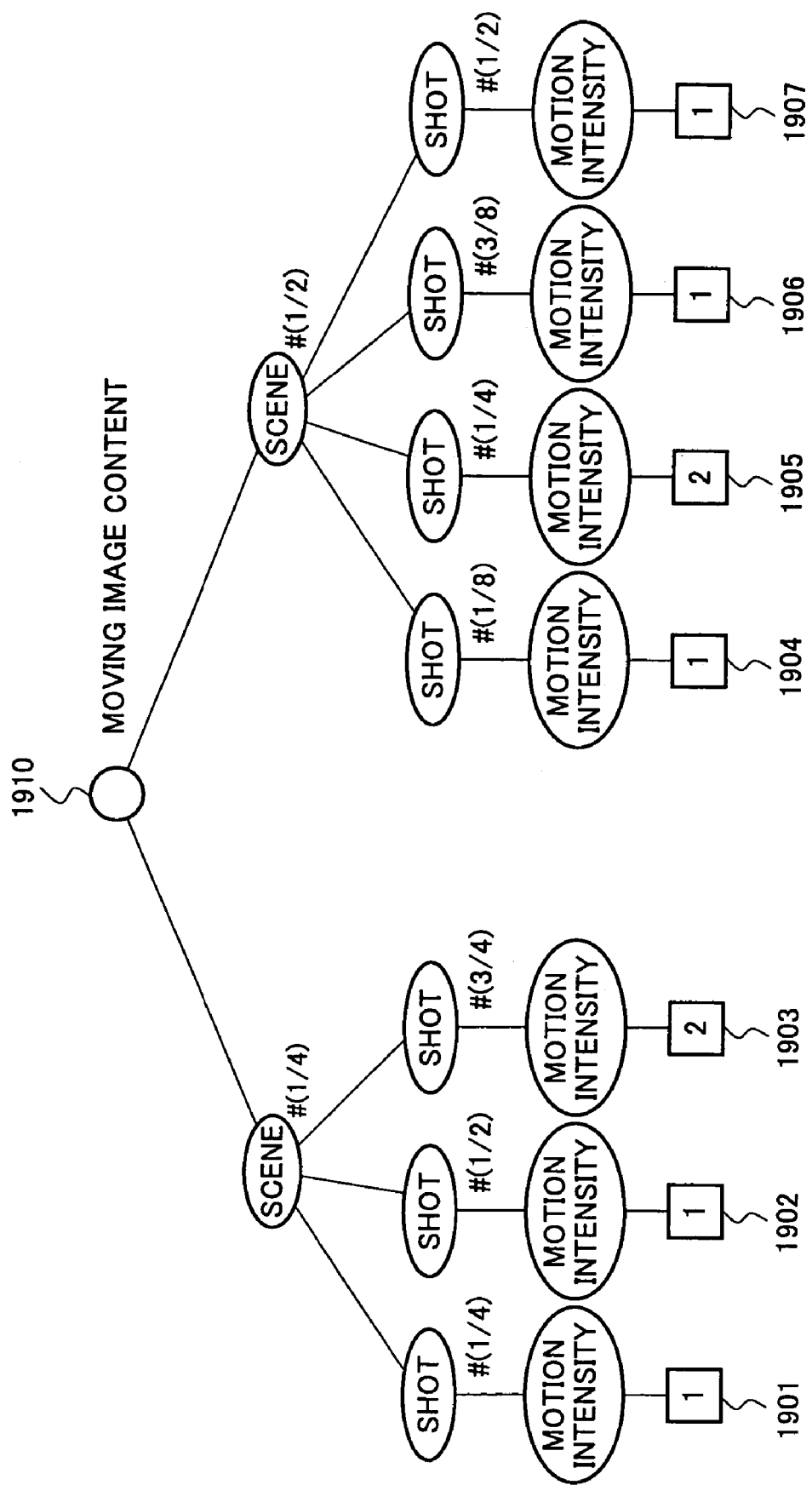
FIG. 19 illustrates another example of search information having a tree structure with the position information represented in a rational number.

If the branch layer determining unit 1704 determines that deficiency is present, the position information is encoded using the deficiency code as previously discussed in connection with the first embodiment with reference to FIG. 9. FIG. 19 illustrates an example of search information having a tree structure that is encoded using the deficiency code. As shown in FIG. 19, a moving image content 1910 is composed of two scenes. A first scene (scene #1/4) is composed of three shots, and a second scene (scene #1/2) is composed of four shots. The shots at scene #1/4 are assigned 1/4, 1/2, and 3/4 as the values of position information. The four shots at scene #1/2 are assigned 1/8, 1/4, 3/8, and 1/2 as position information. In this case, with the initial value=step width=1/8 set, all values are contained in update values. The step width is thus 1/8.

Figure 20:
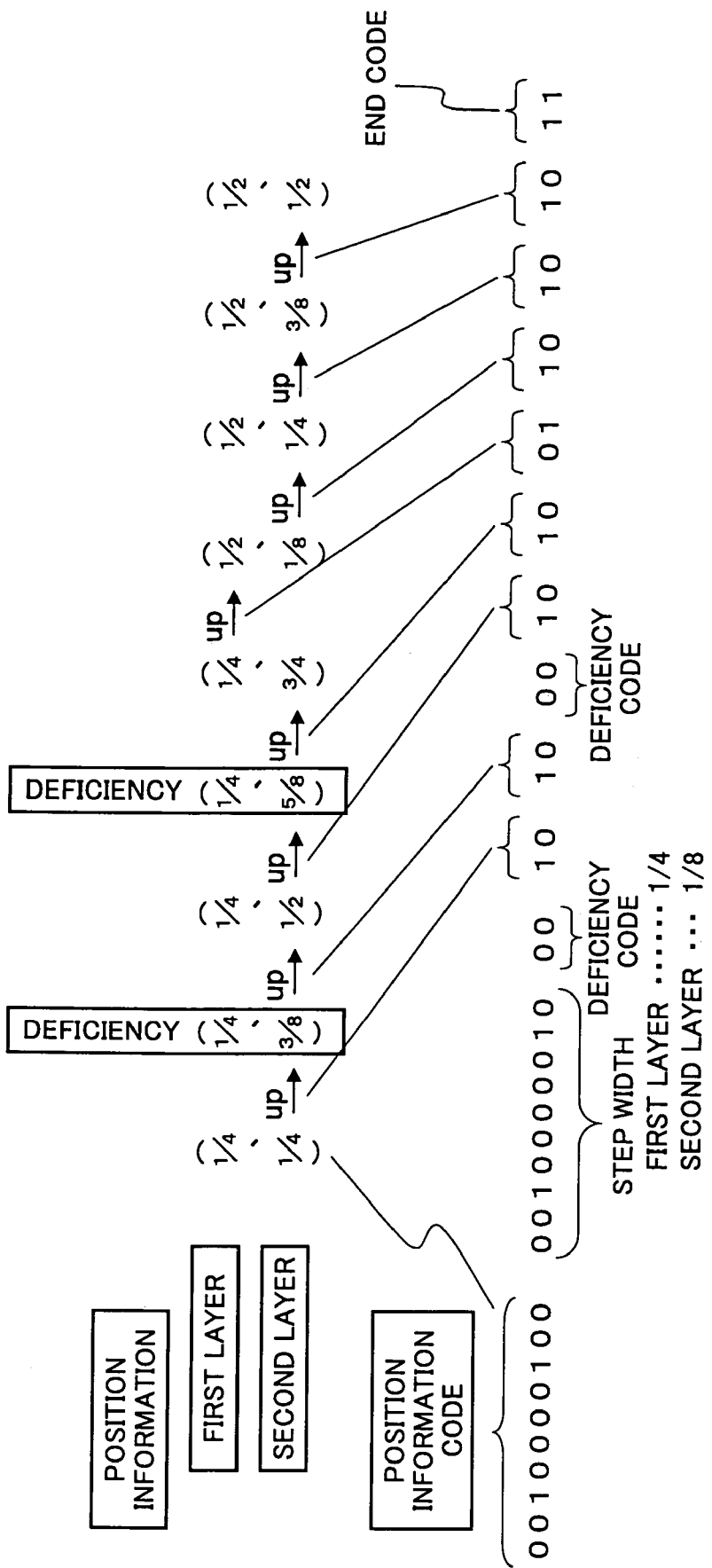
FIG. 20 illustrates another example of position information to be encoded by and a position information code string encoded by one example of the position information encoding device in accordance with the second embodiment of the present invention.

FIG. 20 illustrates position information extracted from identification information corresponding to data 1901-1907 of search information of FIG. 19 and a position information code string into which the position information is encoded. In this example, the position information of the shots forming scene #1/4 includes 1/4, 1/2, and 3/4, and a step width of 1/4 is considered appropriate if determined from these values only. However, since the step width of 1/8 is set as a whole, originally empty positions (1/4,3/8) and (1/4,5/8) appear as deficient positions, and are encoded.

Figure 21:
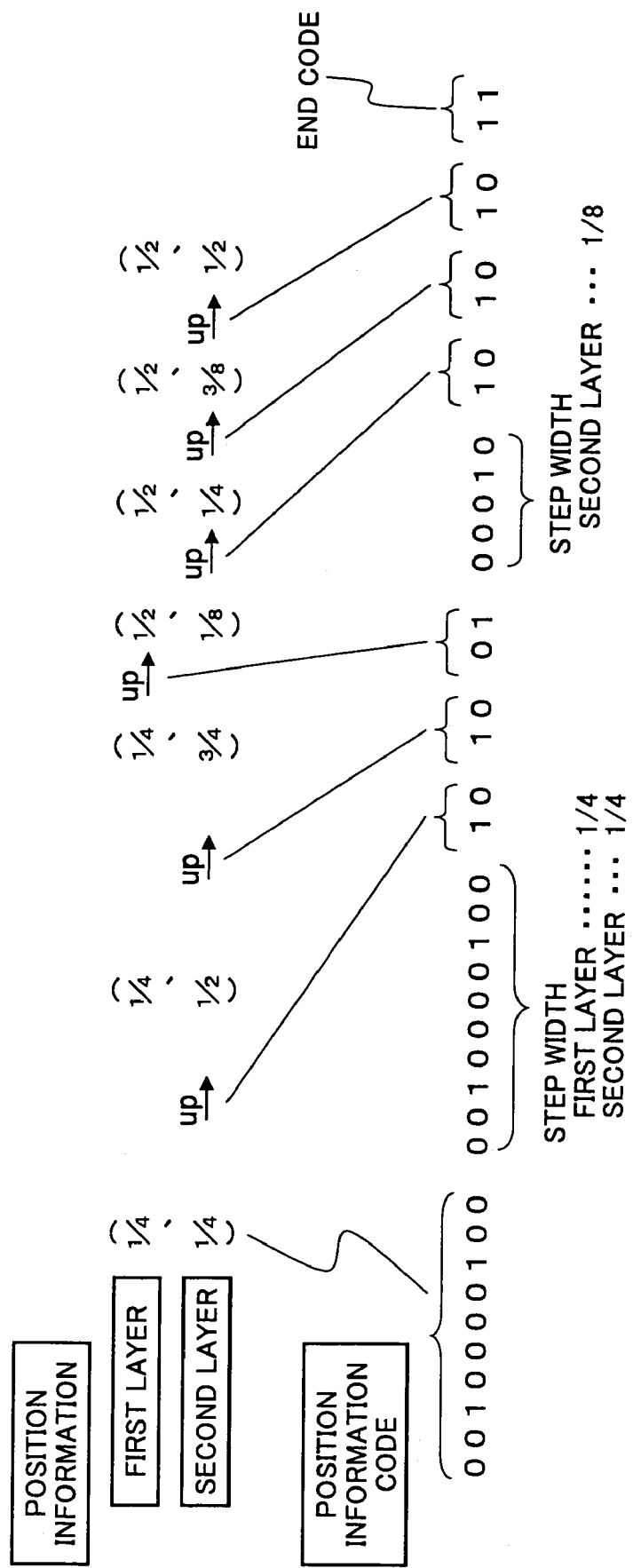
FIG. 21 illustrates yet another example of position information to be encoded by and a position information code string encoded by one example of the position information encoding device in accordance with the second embodiment of the present invention.

To reduce such a redundancy, as shown in FIG. 21, the step width is determined and encoded each time the tree branches. The step width encoded when the tree branches is imparted to a layer present below the branch layer. When the tree branches at the first layer as shown in FIG. 21, the step width is encoded and imparted to a layer below the first layer, namely, the second layer. As the number of layers increases, the number of step widths to be imparted at branching also increases. If three layers are present and the tree branches at the first layer, two step widths corresponding to the second layer and the third layer are encoded and imparted.

Figure 22:
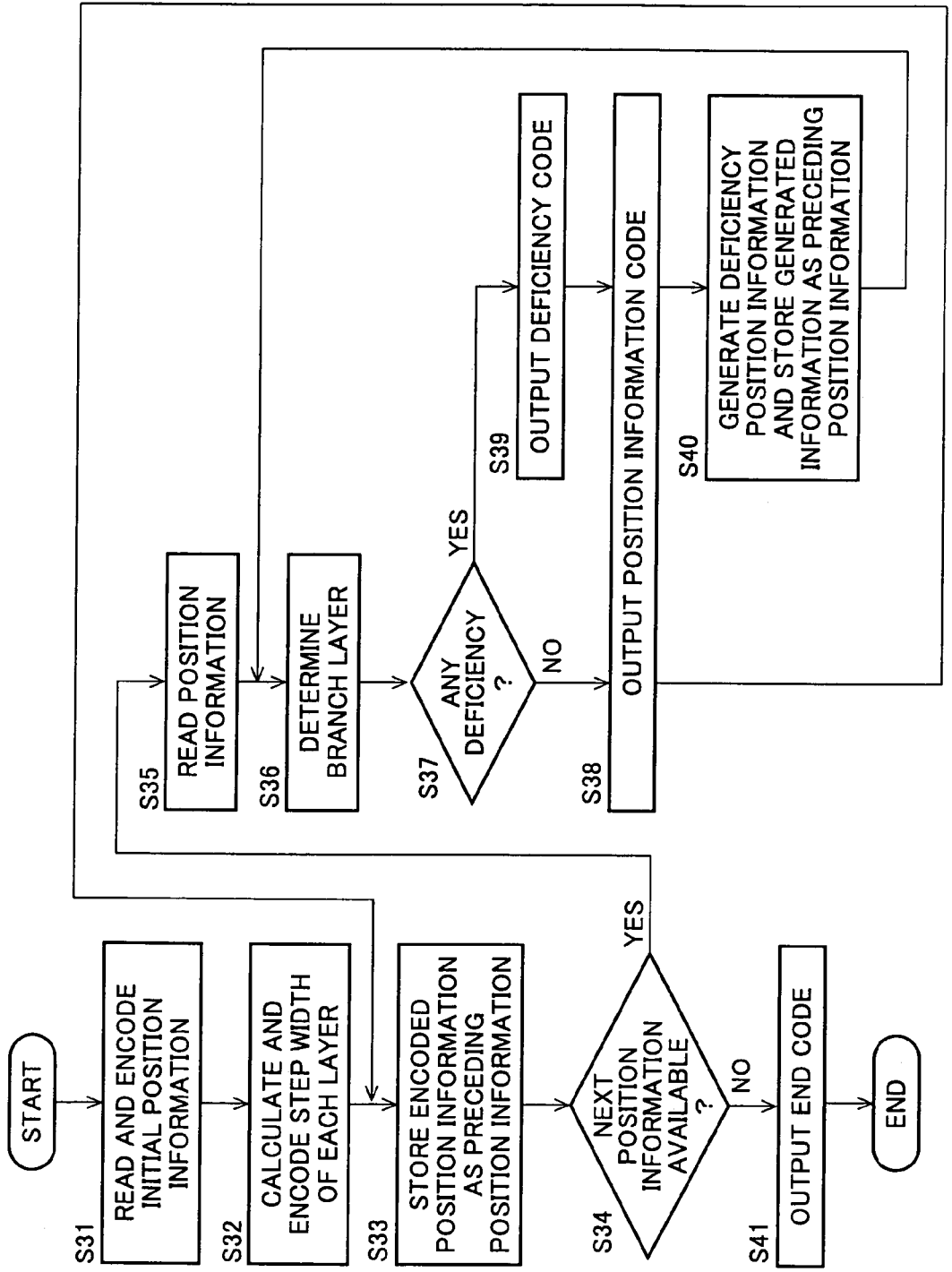
FIG. 22 is a flowchart illustrating a position information encoding method in accordance with the second embodiment of the present invention.

FIG. 22 is a flowchart illustrating a position information encoding method in accordance with the second embodiment of the present invention, in particular, the position information encoding method corresponding to the operation of the encoding device that has been discussed in connection with an example of the position information code string of FIGS. 18 and 20.

The position information encoding method of the second embodiment of the present invention of FIG. 22 is modified from the position information encoding method of the first embodiment of FIG. 10. More specifically, in the position information encoding method of the second embodiment of the present invention of FIG. 22, the position information rearranging step (step S1) is eliminated, a step width encoding step (step S32) is added, and the deficiency determination step (step S7) is modified to a deficiency determination step (step S37) based on the obtained step width. The remaining process of the position information encoding method of the second embodiment remains unchanged from the process of the position information encoding method of the first embodiment. Steps S2, S3, S4, S5, S6, S8, S9, S10, and S11 of FIG. 10 respectively correspond to steps S31, S33, S34, S35, S36, S38, S39, S40, and S41 of FIG. 22.

The position information decoding device of the second embodiment of the present invention is described below with reference to FIG. 23.

Figure 23:
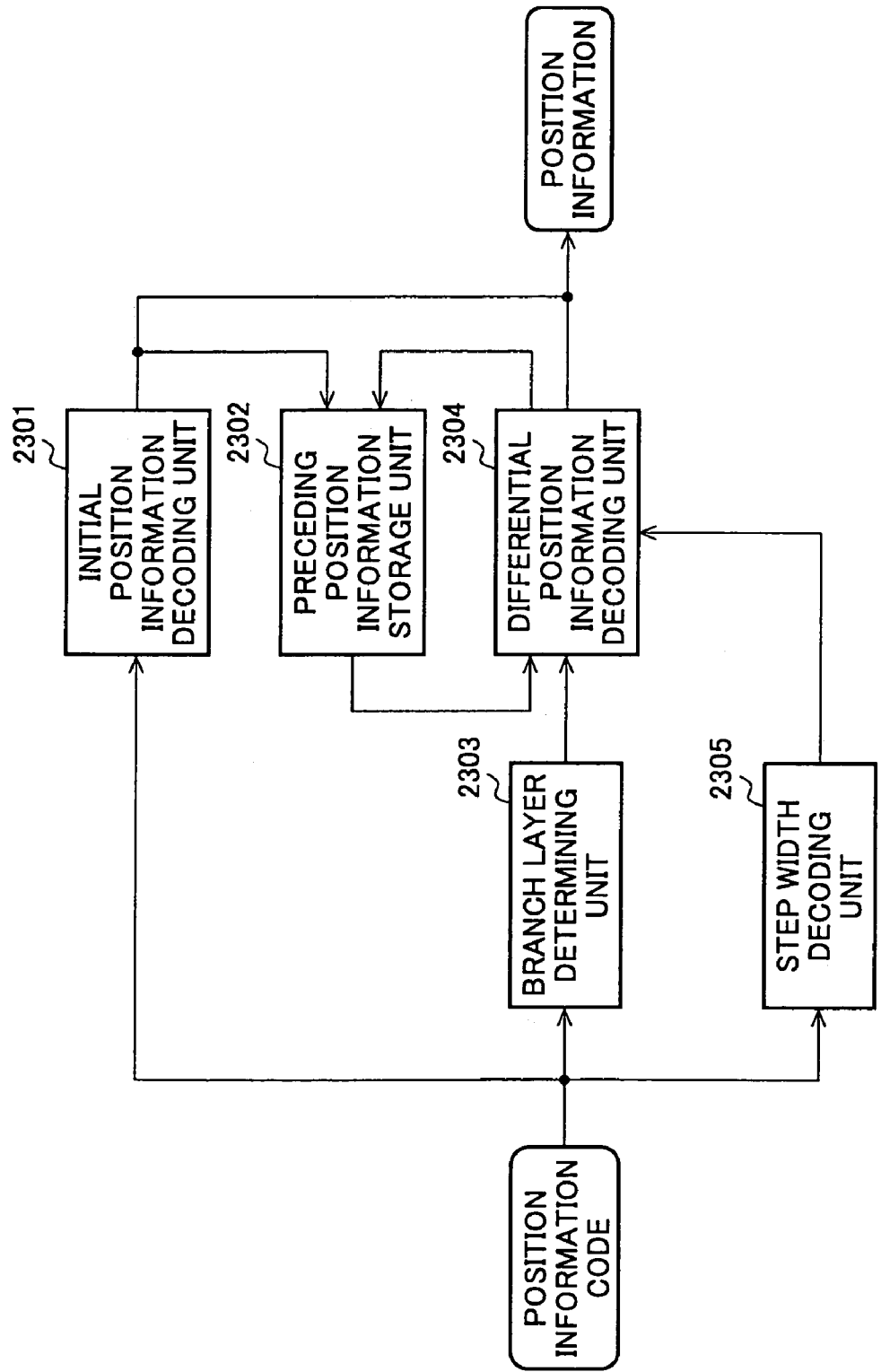
FIG. 23 is a functional block diagram illustrating the schematic structure of a position information decoding device in accordance with the second embodiment of the present invention.

FIG. 23 is a functional block diagram illustrating the schematic structure of the position information decoding device of the second embodiment of the present invention.

The position information decoding device of the second embodiment of the present invention comprises an initial position information decoding unit 2301, a preceding position information storage unit 2302, a step width decoding unit 2305, a branch layer determining unit 2303, and a differential position information decoding unit 2304. The initial position information decoding unit 2301, the preceding position information storage unit 2302, and the branch layer determining unit 2303 are identical to the initial position information decoding unit 1101, the preceding position information storage unit 1102, and the branch layer determining unit 1103 in the functional blocks forming the position information decoding device of the first embodiment of the present invention discussed with reference to FIG. 11.

The operation of the position information decoding device of the present embodiment, except the step width decoding unit 2305 and the differential position information decoding unit 2304, is basically identical to the decoding process of the conventional integer number position information. The operation of the position information decoding device of the present embodiment with the position information code string of FIG. 18 input thereto is described below.

The initial position information decoding unit 2301 decodes initial position information and outputs the resulting position information. As in the first embodiment, the position information encoded using an ordinary method is decoded, and the operation thereof is not particularly discussed.

The initial position information (1/4,1/4) from front 10 bits (5 bits×the number of layers of 2), out of the position information code string of FIG. 18, is decoded, and then recorded and stored in the preceding position information storage unit 2302.

The step width decoding unit 2305 decodes and determines the value of the step width corresponding to each layer. As shown in FIG. 18, a code of 10 bits (5 bits×the number of layers, namely, 2) of the step width subsequent to the code of the initial position information is read, and the step width of 1/4 at the first layer and the step width of 1/4 at the second layer are decoded. The decoded value of the step width at each layer is output to the differential position information decoding unit 2304 for use in decoding the position information.

The step width is encoded/decoded in an ordinary method as the initial position information. The operation of the encoding/decoding is not particularly discussed herein. Here, 5 bits of each code of the initial position information and 5 bits of each code of step width are determined depending on the encoding method.

The branch layer determining unit 2303 successively reads the position information code, and notifies the differential position information decoding unit 2304 of a branch layer indicated by the position information. In the same manner described with reference to the position information decoding device of the first embodiment, the deficiency code can be read to process the deficient position.

After the step width decoding unit 2305 decodes the step width of the position information code string of FIG. 18, the branch layer determining unit 2303 reads a position information code "10". The position information code "10" indicates that the tree branches at the second layer, namely, the shot layer. The differential position information decoding unit 2304 is notified of the determination results. The description of the first embodiment is applicable as is to the type of the position information code and the bit length of the position information code.

The differential position information decoding unit 2304 decodes the position information based on the position information at a preceding cycle stored in the preceding position information storage unit 2302 and the determination results obtained from the branch layer determining unit 2303. The step width obtained as decoded by the step width decoding unit 2305 serves as the update width of the value of the position information represented in a rational number, and an initial value of position information provided to a layer below an upper branch layer when the tree branches at the upper layer.

When the code "10" is determined as being branched at the second layer, namely, the shot layer, the preceding position information storage unit 2302 stores position information (1/4,1/4) decoded by the initial position information decoding unit 2301. The differential position information decoding unit 2304 adds, to the value of the second layer as the branch layer of the stored position information, the step width of 1/4 of the second layer provided by the step width decoding unit 2305. The position information (1/4,1/2) is decoded, and output to the preceding position information storage unit 2302 for storage.

The branch layer determining unit 2303 reads the position information code "01" when the position information (1/4,3/4) is decoded and stored in the preceding position information storage unit 2302. The position information code "01" indicates that the branching takes place at the first layer, namely, the scene layer, and the determination results are output to the differential position information decoding unit 2304.

Based on the determination result from the branch layer determining unit 2303, the differential position information decoding unit 2304 increases the position information (1/4, 3/4), at the first layer, namely, at the branch layer, stored in the preceding position information storage unit 2302, by a step width of 1/4 at the first layer obtained in the step width decoding unit 2305, and imparts a step width of 1/4 at the second layer to the second layer below the branch layer. As a result, position information (1/2,1/4) is decoded. The decoded position information (1/2,1/4) is output while being input into the preceding position information storage unit 2302 for storage.

The above process is repeated until the branch layer determining unit 2303 reads an end code "11", and when the end code "11" is read, the decoding process ends.

The decoding process with deficiency taking place is described below with reference to FIG. 20. As in the first embodiment, a plurality of pieces of position information containing a deficiency are decoded using a deficiency code in the present embodiment.

The process up to the decoding of the step width is identical to the decoding process discussed above with reference to FIG. 18. The step width decoding unit 2305 decodes a step width of 1/4 at the first layer and a step width of 1/8 at the second layer in the position information code string of FIG. 20.

After the step width decoding unit 2305 decodes the step width in the position information code string of FIG. 20, the branch layer determining unit 2303 reads a position information code "00". The position information code "00" is a deficiency code indicative of a deficient position. To this end, the differential position information decoding unit 2304 is notified of the deficient position while the branch layer determining unit 2303 reads a next position information code "10". The position information code "10" indicates that the tree branches at the second layer, namely, the shot layer. The differential position information decoding unit 2304 is notified of the determination results.

The differential position information decoding unit 2304 decodes next position information based on the immediately preceding position information stored in the preceding position information storage unit 2302 and the determination results obtained from the branch layer determining unit 2303. The determination results indicate that the branch layer is the second layer and that the corresponding position is a deficient position.

The preceding position information storage unit 2302 stores position information (1/4,1/4). A step width of 1/8 at the second layer obtained by the step width decoding unit 2305 is added to the value of the second layer, namely, the branch layer in the stored position information. As a result, position information (1/4,3/8) is decoded. However, it is notified that the position represented by the position information (1/4,3/8) is a deficient position. Therefore, the position information is not output outward as decoded position information, and recorded in only the preceding position information storage unit 2302 for storage.

The branch layer determining unit 2303 reads a position information code "10". The position information code "10" indicates that the second layer, namely, the shot layer is a branch layer. The differential position information decoding unit 2304 is notified of the determination results.

At this point, the preceding position information storage unit 2302 stores position information (1/4,3/8). A step width of 1/8 at the second layer obtained by the step width decoding unit 2305 is added to the value of the second layer as the branch layer in the stored position information, and as a result, position information (1/4,1/2) is decoded. The position represented by the position information (1/4,1/2) is not a deficient position, and the position information is output outward as decoded position information while also being stored in the preceding position information storage unit 2302. Even if a deficient position is present in this way, correct position information is decoded and obtained.

The decoding process of the position information code string of FIG. 21 is described below.

The process up to decoding the position information (1/4, 3/4) is identical to the above-described decoding process of FIG. 18. After initial position information (1/4,1/4) in the position information code string of FIG. 21 is decoded, the step width decoding unit 2305 decodes a step width of 1/4 at the first layer and a step width of 1/4 at the second layer. In response to position information codes "10" and "10" to be read, position information (1/4,1/2) and (1/4,3/4) is successively decoded and output.

The branch layer determining unit 2303 reads the position information code "01". The position information code "01" indicates that the first layer is the branch layer.

The position information code string of FIG. 21 is encoded so that a new step width is encoded for a layer below a branch layer when the branch layer is determined. If the first layer is a branch layer, a step width for the second layer is encoded and provided. Therefore, when it is determined that the first layer is the branch layer, the step width decoding unit 2305 reads a 5 bit code as a step width of the second layer, thereby decoding a new second layer step width of 1/8.

A new step width is not decoded with the second layer being the branch layer in the above example because no layer is present below the second layer. The two layers, namely, the first layer and the second layer, are used in the above example. If a first layer is determined as being a branch layer in a three-layer structure of the first through third layers, codes of the encoded step widths of the second layer and the third layer following the first layer are decoded. More specifically, the step widths of the layers below the branch layer are decoded. The same is true even if the number of layers is increased.

The preceding position information storage unit 2302 stores position information (1/4,3/4). The differential position information decoding unit 2304 adds a step width of 1/4 at the first layer obtained in the step width decoding unit 2305 to the value of the first layer as the branch layer in the stored position information. A step width of 1/8 at the second layer newly decoded by the step width decoding unit 2305 is imparted to the second layer below the branch layer as an initial value. Position information (1/2,1/8) is thus decoded and obtained.

The decoded position information (1/2,1/8) is output while being input into and stored in the preceding position information storage unit 2302. The branch layer determining unit 2303 reads a position information code "10" indicating that the second layer is the branch layer. The differential position information decoding unit 2304 adds a step width of 1/8 at the second layer to the position information (1/2,1/8) stored in the preceding position information storage unit 2302, thereby decoding next position information (1/2,1/4).

After the position information (1/2,3/8) and (1/2,1/2) is decoded, an end code "11" is read and the decoding process ends.

If a tree having variations in assignments of values of position information from branch to branch is encoded, the method of FIG. 21 of encoding/decoding the step width at each branching reduces the effect of drop in encoding efficiency in comparison with the method of FIG. 20 using the deficiency code. The step width to be encoded/decoded in the above-referenced embodiments serves as an incremental width in the value of position information and an initial value of the position information. In accordance with the present invention, with the incremental width and the initial value commonly serving as the step width, the drop in the encoding efficiency is reduced while the position information in the rational number representation is difference encoded. Alternatively, the step width and the initial value may be separately encoded. In this case, the step widths and the initial position value at the layers below the branch layer are encoded/decoded in contrast to the embodiment discussed with reference to FIG. 21 where the step widths at the layers below the branch layer are encoded/decoded. In this manner, when there is a difference between the initial position value and the step width, the encoding/decoding process is performed with loss minimized.

In an extreme case, the step widths are encoded at the same time for all position information codes, and then the encoded step widths are attached. A differential encoding/decoding method for encoding/decoding the position information with the step width flexibly changed is thus provided.

Figure 24:
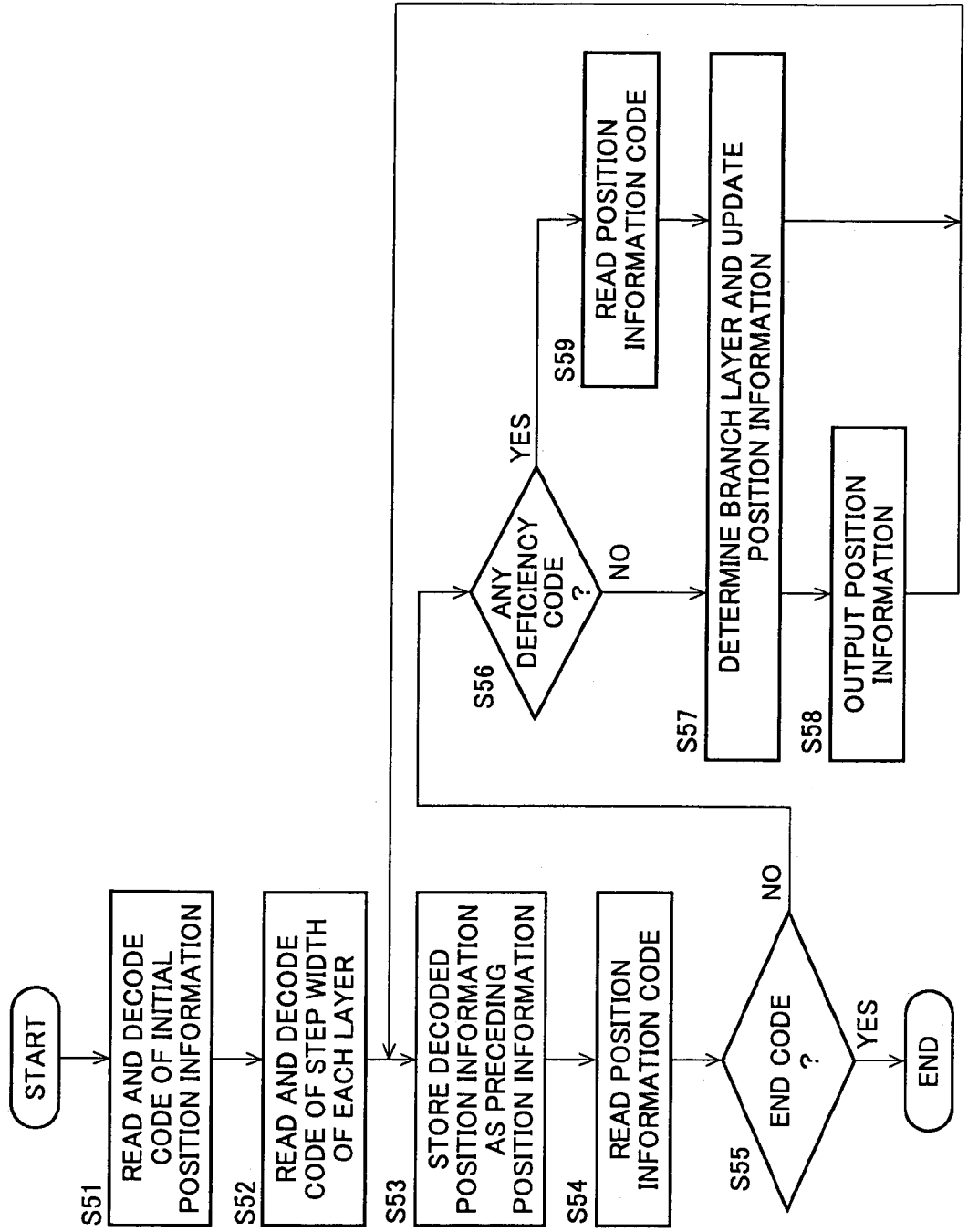
FIG. 24 is a flowchart illustrating a position information decoding method in accordance with the second embodiment of the present invention.

FIG. 24 is a flowchart illustrating the position information decoding method of the second embodiment of the present invention, in particular, the position information decoding method corresponding to the operation of the decoding device discussed with reference to an example of the position information code string of FIGS. 18 and 20.

The position information decoding method of the second embodiment of the present invention of FIG. 24 is modified from the position information decoding method of the first embodiment of the present invention of FIG. 16. More specifically, in the position information decoding method of the second embodiment of the present invention of FIG. 24, a position information rearranging step (step S29) is eliminated, a step width decoding step (step S52) is added, and a differential position information decoding step (step S57) based on the step width obtained through decoding is included as a modification to the differential position information decoding step (step S26). The rest of the process of the position information decoding method is identical to the position information decoding method of the first embodiment, and steps S21, S22, S23, S24, S25, S27, and S28 of FIG. 16 correspond to steps S51, S53, S54, S55, S56, S58, and S59 of FIG. 24, respectively.

In the aforementioned discussion, the position information encoding device comprising the position information rearranging unit 101 in accordance with the first embodiment of the present invention is different from the position information encoding device comprising the step width determining unit 1701 and the step width encoding unit 1706 in accordance with the second embodiment of the present invention. Alternatively, one position information encoding device may contain all these functional blocks. Prepared in such an arrangement is a flag indicating whether an encoding process involving the rearrangement of the position information (the process of the position information rearranging unit 101) or an encoding process involving the encoding of the step width (the process of the step width determining unit 1701 and the step width encoding unit 1706) is performed. The value of the flag is recorded together with the position information code string. Alternatively, the value of the flag can be recorded as attribute information of the position information code string in a stream or a file separate from the position information code string.

The position information decoding device including the position information rearranging unit 1105 in accordance with the first embodiment of the present invention and the position information decoding device including the step width decoding unit 2305 in accordance with the second embodiment of the present invention are embodied as separate devices. Alternatively, one position information decoding device can contain all these functional blocks. Such a position information decoding device receives the flag recorded by the position information encoding device, and switches between the decoding operation involving the rearrangement process (the process of the position information rearranging unit 1105) and the decoding operation involving the decoding of the step width (the process of the step width decoding unit 2305).

As previously discussed, by performing the rearrangement process, the position information encoding device and the position information decoding device in accordance with the first embodiment of the present invention encode/decode the position information using the differential encoding in the same manner as the integer number position information is encoded/decoded, even if the position information is represented in the rational numbers having the order relationship from which update values are not uniquely identified. The position information encoding device and the position information decoding device in accordance with the second embodiment of the present invention encode the step width and record the encoded step width together with the position information code. The differential encoding can thus performed with the order relationship of the original position information maintained. The encoding/decoding process of the position information is performed in an intuitively understandable manner. By using the flag for switching, an appropriate encoding method is selected and used depending on situations.

The position information encoding method including the position information rearranging step S1 in accordance with the first embodiment is separate from the position information encoding method including the step width encoding step S32 in accordance with the second embodiment. Alternatively, a position information encoding method including these steps can be arranged. The position information decoding method including the position information rearranging step S29 in accordance with the first embodiment is separate from the position information decoding method including the step width decoding step S52 in accordance with the second embodiment. Alternatively, a position information decoding method including these steps can be arranged.

The position information encoding device, the position information encoding method, the position information decoding device, and the position information decoding method in accordance with the embodiments of the present invention have been discussed. The present invention can be embodied as a program for causing a computer as the devices (the encoding device and/or the decoding device) of the above-referenced embodiments or as a program for causing a computer to perform the steps of each of the methods of the above-referenced embodiments (the encoding method and/or the decoding method), or a computer readable recording medium recording each of the programs.

A program installed in the computer to cause the computer to perform as the device of the present invention can be easily embodied so that CPU or MPU of the computer functions as the elements of each device (corresponding to respective means) or so that the CPU or the MPU performs each step in each of the above-described methods.

Figure 25:
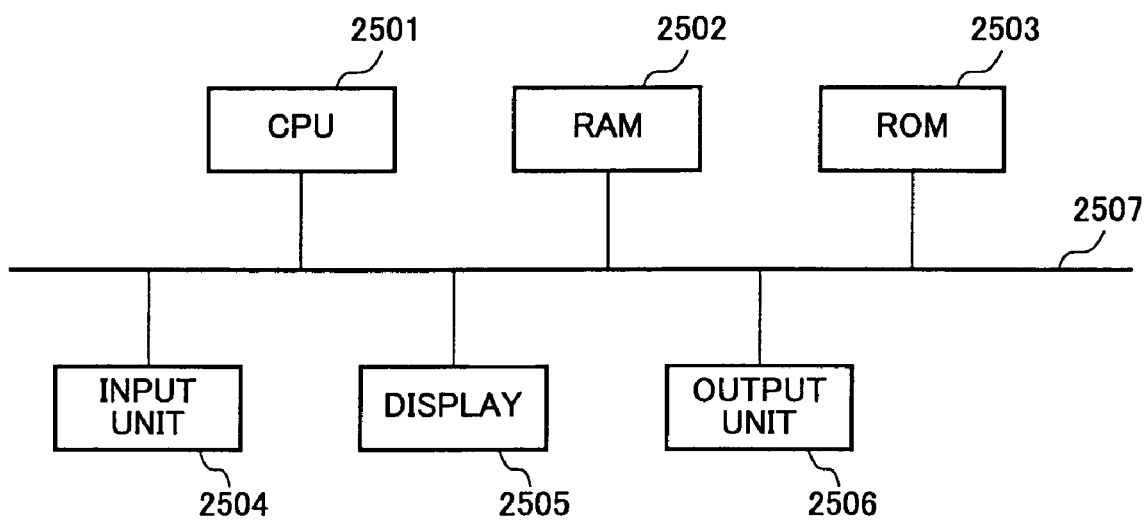
FIG. 25 illustrates the structure example of a widely available information processing device shown to explain the device of the present invention.
Figure 26:
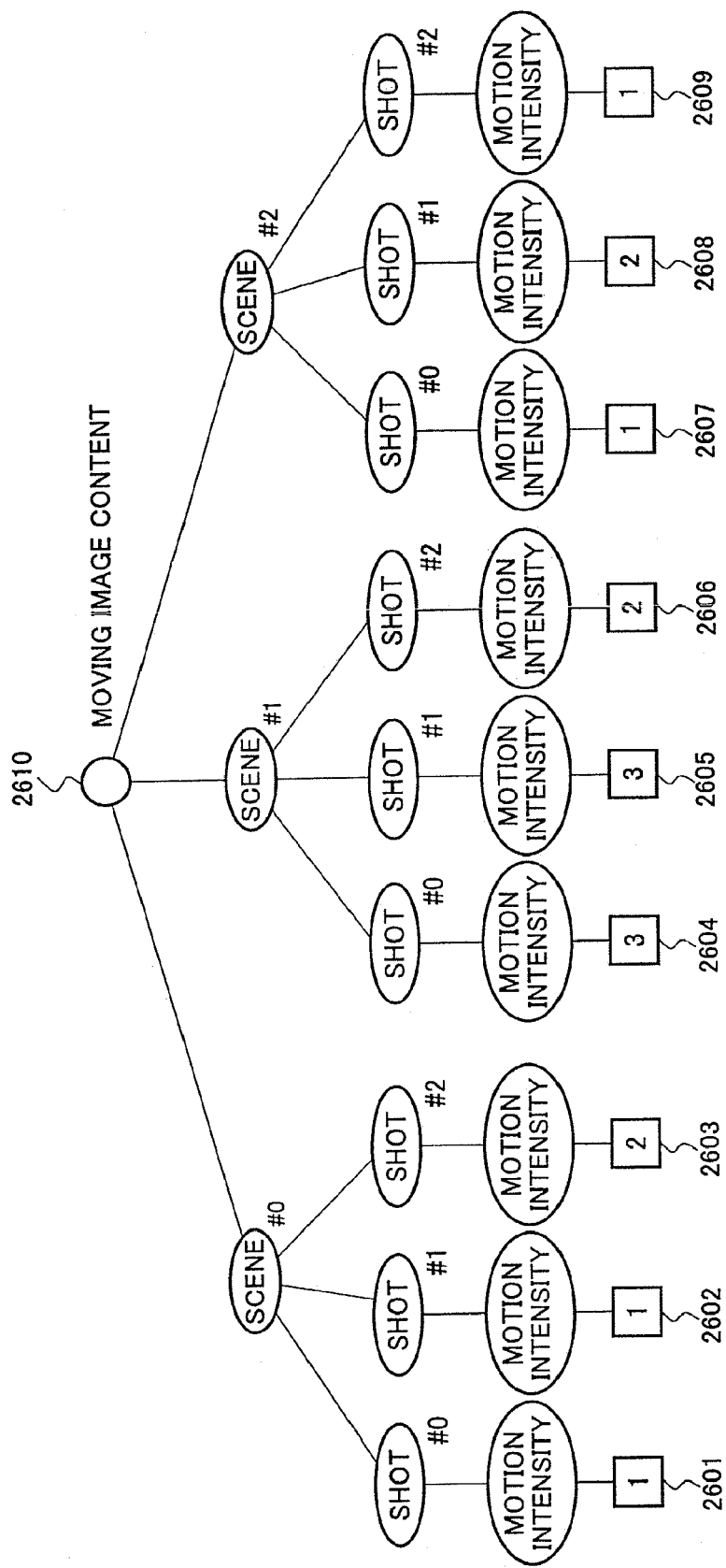
FIG. 26 illustrates one example of search information having a tree structure for moving image contents in accordance with the known art.
Figure 27:
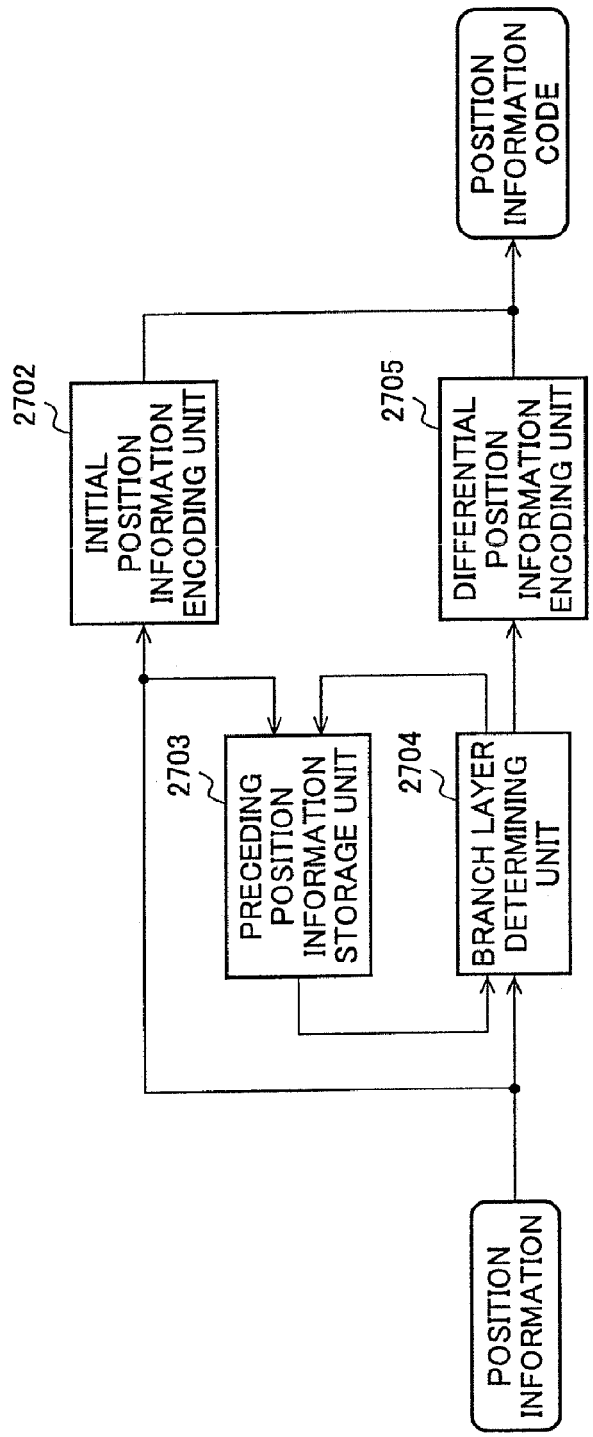
FIG. 27 is a functional block diagram illustrating the schematic structure of an MPEG-7 position information encoding device in accordance with the known art.
Figure 28:
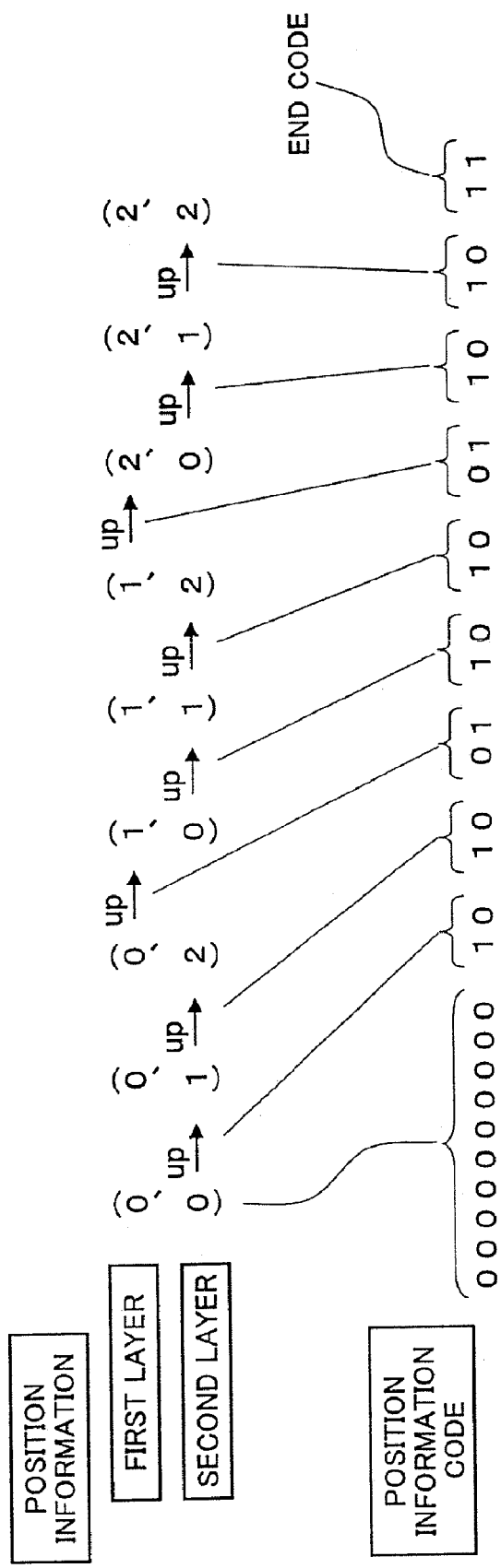
FIG. 28 illustrates one example of position information to be encoded by and a position information code string encoded by the position information encoding device of the known art.
Figure 30:
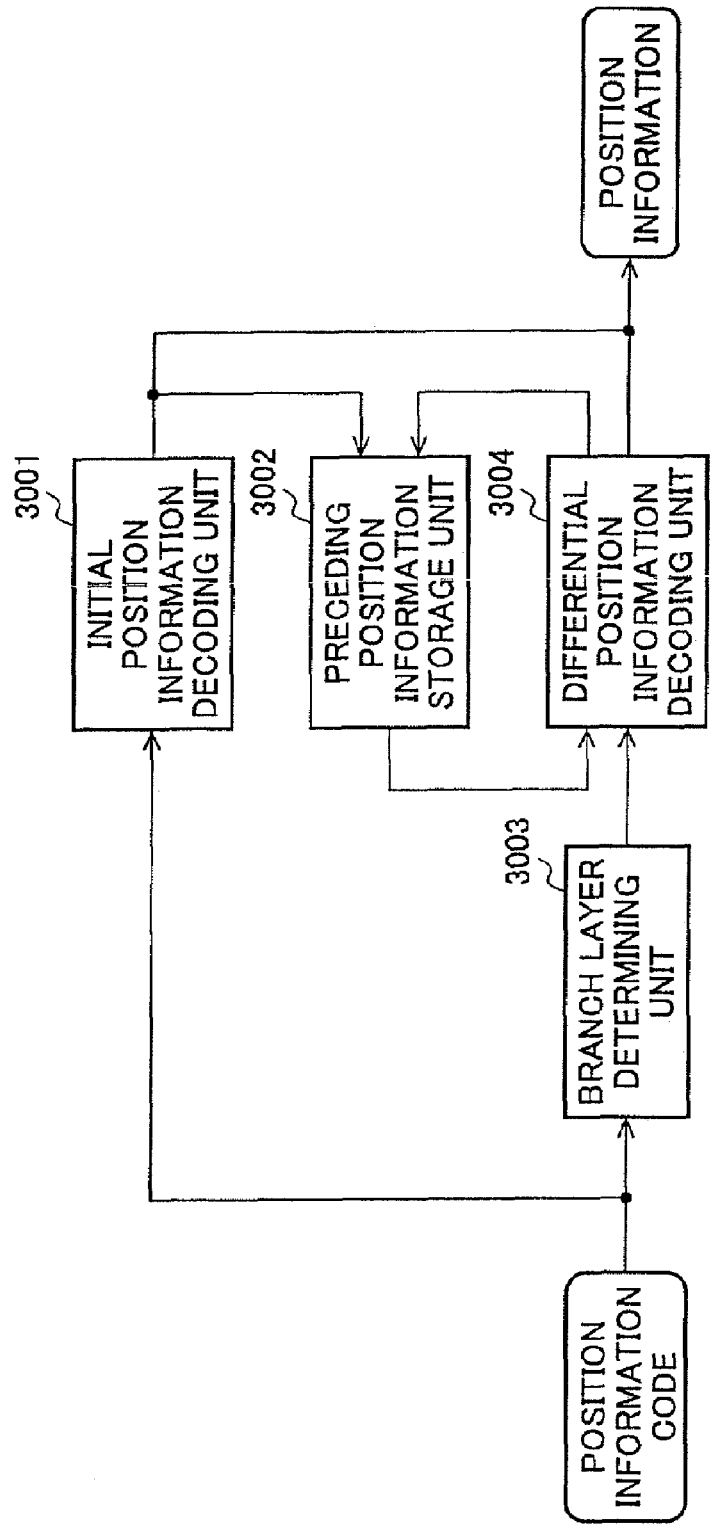
FIG. 30 is a functional block diagram illustrating the schematic structure of a position information decoding device of the known art.

FIG. 25 illustrates the structure example of an ordinary information processing device shown to explain the device of the present invention.

The process of the device of the position information for processing each pieces of information is described below with reference to the structure example of the ordinary information processing device of FIG. 25. Information handled by the device of the present invention is temporarily stored in RAM 2502 at the moment of the process, and then stored as structural data in an image database in ROM 2503. The program for causing the computer to function as the device of the present invention is stored in ROM 2503, and then read by a CPU 2501 for execution. An intermediate report and intermediate results of the process are displayed on a display 2505 for a user. If necessary, the user can input parameters required for the process using a keyboard, or a mouse (pointing device). The program comprises preferably a graphical user interface for the display 2505 so that the user may easily input the parameters. Intermediate data produced during execution of another process is also stored in the RAM 2502, and the CPU 2501 reads, modifies, and writes the intermediate data as necessary. The CPU 2501, the RAM 2502, the ROM 2503, an input unit 2504, the display (CRT, LCD, or the like) 2505, and an output unit (printer, communication unit, or the like) 2506 are interconnected via a bus 2507, or portions of the respective elements can be interconnected via a network such as a LAN. The communication unit exchanges data with another device via a communication line.

Embodiments of the recording medium storing program and data for performing the encoding/decoding functions of the position information in accordance with the present invention are described below. More specifically, the recording media include a CD-ROM, a magneto optical disk, DVD-ROM, FD, a flash memory, a memory stick, a variety of ROMs, and a variety of RAMs. The recording medium storing the program for causing the computer to perform the functions of encoding/decoding position information of the device of each of the embodiments of the present invention is supplied to perform the function of the device. With the above-described recording medium loaded onto the information processing device such as the computer, the information processing device reads the program, or the program is stored onto the recording medium of the information processing device, and is read as necessary. The encoding/decoding functions for encoding/decoding the position information in accordance with the present invention are thus performed.

The invention claimed is:

1. An encoding device for encoding a plurality of pieces of position information corresponding to a plurality of leaves and/or nodes at a common layer in a tree structure, comprising:
   a rearranging unit for rearranging, in accordance with a predetermined order relationship, the plurality of pieces of position information to be encoded,
   a determining unit for determining, in accordance with the predetermined order relationship, a branch layer of two consecutive pieces of position information from among the plurality of pieces of position information output from the rearranging unit, and
   an encoding unit for outputting a code corresponding to the branch layer,
   wherein the plurality of pieces of position information are rational number position information represented by a rational number, and wherein the predetermined order relationship is determined by an order of magnitude of resolution of the rational number.

2. The encoding device according to claim 1, wherein the tree structure represents search information, and wherein the leaves or nodes corresponding to the plurality of pieces of position information to be encoded correspond to elements of the same type contained in the search information.

3. An encoding device for encoding a plurality of pieces of position information corresponding to a plurality of leaves and/or nodes at a common layer in a tree structure, the plurality of pieces of position information to be encoded being arranged in accordance with a predetermined order relationship, comprising:
   a determining unit for determining, in accordance with the predetermined order relationship, a branch layer of two consecutive pieces of position information from among the plurality of pieces of position information to be encoded, and
   an encoding unit for outputting a code corresponding to the branch layer,
   wherein the plurality of pieces of position information are rational number position information represented by a rational number, and wherein the predetermined order relationship is determined by an order of magnitude of resolution of the rational number.

4. The encoding device according to claim 1 or 3, wherein each rational number is equal to a natural number over the power of 2.

5. An encoding method for encoding a plurality of pieces of position information corresponding to a plurality of leaves and/or nodes at a common layer in a tree structure, comprising:
   a rearranging step of rearranging, in accordance with a predetermined order relationship, the plurality of pieces of position information to be encoded,
   a determining step of determining, in accordance with the predetermined order relationship, a branch layer of two consecutive pieces of position information from among the plurality of pieces of position information output in the rearranging step, and an encoding step of outputting a code corresponding to the branch layer using an encoding unit, wherein the plurality of position information are rational number position information represented by a rational number, and wherein the predetermined order relationship is determined by an order of magnitude of resolution of the rational number.

6. The encoding method according to claim 5, wherein the tree structure represents search information, and wherein the leaves or nodes corresponding to the plurality of pieces of position information to be encoded correspond to elements of the same type contained in the search information.

7. The encoding method of claim 5, wherein the plurality of pieces of position information to be encoded are retrieved from a storage unit by said encoding unit.

8. An encoding method for encoding a plurality of pieces of position information corresponding to a plurality of leaves and/or nodes at a common layer in a tree structure, the plurality of pieces of position information to be encoded being arranged in accordance with a predetermined order relationship, comprising:

a determining step of determining, in accordance with the predetermined order relationship, a branch layer of two consecutive pieces of position information from among the plurality of pieces of position information to be encoded, and an encoding step of outputting a code corresponding to the branch layer using an encoding unit, wherein the plurality of position information are rational number position information represented by a rational number, and wherein the predetermined order relationship is determined by an order of magnitude of resolution of the rational number.

9. The encoding method of claim 8, wherein the plurality of pieces of position information to be encoded are retrieved from a storage unit by said encoding unit.

10. The encoding method according to claim 5 or 8, wherein each rational number is equal to a natural number over the power of 2.

11. A decoding device for decoding a string of position information code composed of a plurality of pieces of encoded position information corresponding to a plurality of leaves and/or nodes at a common layer in a tree structure, comprising:

a storage unit for successively storing decoded position information, a determining unit for determining a branch layer of two consecutive pieces of position information based on the position information code, and a decoding unit for updating the value of the position information, stored in the storage unit, corresponding to the branch layer by one notch in accordance with a predetermined order relationship, wherein the plurality of pieces of position information are rational number position information represented by a rational number, and wherein the predetermined order relationship is determined by an order of magnitude of resolution of the rational number.

12. The decoding device according to claim 11, further comprising rearranging unit for rearranging the plurality of pieces of decoded position information in accordance with the order of magnitude.

13. The decoding device according to claim 12, further comprising calculating unit for calculating a serial number assigned to each piece of decoded position information, the serial number representing the order of magnitude.

14. The decoding device according to claim 11, wherein the tree structure represents search information, and wherein the leaves or nodes corresponding to the position information to be decoded correspond to elements of the same type contained in the search information.

15. The decoding device according to claim 11, wherein each rational number is equal to a natural number over the power of 2.

16. A decoding method for decoding a string of position information code composed of a plurality of pieces of encoded position information corresponding to a plurality of leaves and/or nodes at a common layer in a tree structure, comprising:

a storage step of successively storing decoded position information in a storage unit, a determining step of determining a branch layer of two consecutive pieces of position information based on the position information code, and a decoding step of updating the value of the position information, stored in the storage unit, corresponding to the branch layer by one notch in accordance with a predetermined order relationship using a decoding unit, wherein the plurality of pieces of position information are rational number position information represented by a rational number, and wherein the predetermined order relationship is determined by an order of magnitude of resolution of the rational number.

17. The decoding method according to claim 16, further comprising a rearranging step of rearranging the plurality of pieces of decoded position information in accordance with the order of magnitude.

18. The decoding method according to claim 17, wherein the rearranging step further comprises a calculating step of calculating a serial number assigned to each piece of decoded position information, the serial number representing the order of magnitude.

19. The decoding method according to claim 16, wherein the tree structure represents search information, and wherein the leaves or nodes corresponding to the position information to be decoded correspond to elements of the same type contained in the search information.

20. The decoding method according to claim 16, wherein each rational number is equal to a natural number over the power of 2.

21. A computer readable recording medium having stored thereon a computer program that, when executed, performs:

a rearranging step of rearranging, in accordance with a predetermined order relationship, the plurality of pieces of position information to be encoded, a determining step of determining, in accordance with the predetermined order relationship, a branch layer of two consecutive pieces of position information from among the plurality of pieces of position information output in the rearranging step, and an encoding step of outputting a code corresponding to the branch layer, wherein the plurality of pieces of position information are rational number position information represented by a rational number, and wherein the predetermined order relationship is determined by an order of magnitude of resolution of the rational number.

22. A computer readable recording medium having stored thereon a computer program that, when executed, performs:
- a storage step of successively storing decoded position information,
- a determining step of determining a branch layer of two consecutive pieces of position information based on the position information code, and
- a decoding step of updating the value of the position information, stored in the storage step, corresponding to the branch layer by one notch in accordance with a predetermined order relationship, wherein the plurality of pieces of position information are rational number position information represented by a rational number, and
- wherein the predetermined order relationship is determined by an order of magnitude of resolution of the rational number.

* * * * *

UNITED STATES PATENT AND TRADEMARK OFFICE
CERTIFICATE OF CORRECTION

PATENT NO.        : 7,624,326 B2                                                    Page 1 of 1
APPLICATION NO.   : 10/543005
DATED             : November 24, 2009
INVENTOR(S)       : Watanabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 858 days.

Signed and Sealed this

Twenty-sixth Day of October, 2010

David J. Kappos
*Director of the United States Patent and Trademark Office*